(12) United States Patent
Sato et al.

(10) Patent No.: US 6,863,571 B2
(45) Date of Patent: Mar. 8, 2005

(54) COMPOSITE TYPE CARD CONNECTOR

(75) Inventors: Shigeru Sato, Chiba (JP); Yosuke Takai, Sakura (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 10/807,312

(22) Filed: Mar. 24, 2004

(65) Prior Publication Data

US 2004/0192096 A1 Sep. 30, 2004

(30) Foreign Application Priority Data

Mar. 25, 2003 (JP) .......................................... 2003-083777
Mar. 2, 2004 (JP) .......................................... 2004-058232

(51) Int. Cl.[7] .............................................. H01R 24/00
(52) U.S. Cl. ..................................................... 439/630
(58) Field of Search .............................. 439/630, 946; 361/737

(56) References Cited

U.S. PATENT DOCUMENTS 6,666,724 B1 * 12/2003 Lwee .......................... 439/630
6,699,053 B2 * 3/2004 Kuroda ........................ 439/218
6,716,066 B1 * 4/2004 Kuo ............................. 439/630
6,780,062 B2 * 8/2004 Liu et al. ..................... 439/630

FOREIGN PATENT DOCUMENTS

EP       1 146 474 A1     10/2001

* cited by examiner

*Primary Examiner*—Tho D. Ta
(74) *Attorney, Agent, or Firm*—Finnegan, Henderson, Farabow, Garrett & Dunner, LLP

(57) ABSTRACT

A composite type card connector of the present invention includes a connector body, a cover member, first contact members for a small card, second contact members for a large card, and a switching operation mechanism having a movable plate and a operating plate, such that a card-mounting section in the connector body is switched to another one by the switching operation mechanism so that two kinds of cards different in thickness and/or width can be commonly inserted into the same composite type card connector.

15 Claims, 54 Drawing Sheets

COMPOSITE TYPE CARD CONNECTOR

This application claims priority from Japanese Patent Application Nos. 2003-083777 filed Mar. 25, 2003 and 2004-058232 filed Mar. 2, 2004, which are incorporated hereinto by reference.

BACKGROUND OF THE INVENTION

1. Field of the Invention

The present invention relates to a composite type card connector used for an information terminal device or an electronic instrument such as a portable telephone, a telephone set, PDA (personal digital assistance), a game machine, a notebook type personal computer, a portable audio set, a television set, a video deck or a digital camera, and so on.

2. Description of the Related Art

Recently, in an information terminal device or an electronic instrument such as a portable telephone, a telephone set, PDA (personal digital assistance), a game machine, a notebook type personal computer, a portable audio set, a television set, a video deck or a digital camera, the use of IC cards, PC cards, SD cards, SIM cards or the like in which IC parts called as IC chips for CPU or memory are incorporated have been rapidly increased, and therefore, a composite type card connector has been widely required for inserting a small-sized memory card such as an IC card, PC card, SD card or SIM card. Particularly, a composite type card connector thin in thickness and small in size as a whole has been required, having a strength sufficient for being durable against the frequent insert and withdrawal of the card, capable of easily discharging the inserted card, as well as commonly usable for two kinds of cards having different sizes.

In the conventional composite type card connector, however, it is necessary for the card to be modified when two kinds of cards such as an IC card, PC card, SD card or SIM card, different in thickness and/or width are commonly used by the same composite type card connector. Further, in the conventional composite type card connector, card-inserting openings matched with sizes of the respective cards are provided for a card-mounting section. In such a case, it has been required that cards different in size are mounted to a single composite type card connector because of the miniaturization of the device to be used and the limitation of installation space for an internal printed circuit board.

For example, as described in European Patent Application Laid-open No. 1146474, the conventional composite type card connector is provided in a connector housing with a pair of guide grooves for supporting opposite side edges of an upper body of a first thicker card and opposite side edges of a body of a second thinner card and guiding the first and second cards to be inserted or discharged, and side walls for defining a space for accommodating a lower body of the first card beneath a space formed between the pair of guide grooves. However, in the prior art described in this publication, it is necessary to modify the cards so that two kinds of cards are usable in the same composite type card connector.

Also, since the cards are different from each other in length, width and/or thickness as a whole, if contacts are provided in conformity with the small card, the contacts are largely displaced when the large card is inserted, and when the large card is inserted or discharged, the card is damaged by the contacts to deteriorate the durability of the card. Further, if a relief is provided at a front end of the contact to avoid the buckling of the contact, there is a problem in that a mounting height becomes larger.

SUMMARY OF THE INVENTION

An object of the present invention is to solve the above-mentioned problems in the prior art. A concrete object of the present invention is to provide such a composite type card connector capable of using two kinds of cards different in thickness and/or width without any modification of cards, in which a movable plate for retaining a contact force of the small card moves upward and downward.

To achieve the above-mentioned object, the composite type card connector of the present invention comprises a connector body having a card-inserting opening, at least one side of which is open, a cover member combined with the connector body, and a plurality of contacts consisting of first contact members for a first card and second contact members for a second card arranged within the connector body, wherein a switching operation mechanism having a movable plate and an operating plate is provided for using the first and second cards which are two kinds of cards of different sizes, so that a card-mounting section in the connector body is switched by the switching operation mechanism. Accordingly, it is possible to use cards different in the cross-sectional dimensions from each other by one composite type card connector of the present invention without any trouble even though there is no modification of the cards. Also, it is possible to identify the small and large cards from each other. Further, since the composite type card connector itself of the present invention can be of a flat and thin housing shape, it is suitably usable for information terminal devices or various electronic instruments such as a portable telephone or a music microphone.

In the composite type card connector of the present invention, a locking mechanism which is elastically biased is provided for fixing the movable plate of the switching operation mechanism when the first card is inserted. Accordingly, the small card can be retained by the movable plate, and a height of the contact section of the contact can be freely set so that the interference with the large card becomes minimum. Also, since the locking member of the locking mechanism is always biased with the spring member toward the card-inserting opening, it is possible to realize a structure capable of preventing the small card from being forcibly released.

In the composite type card connector of the present invention, stepped sections are disposed in the connector body in correspondence to the cards of different sizes. Accordingly, it is possible to use a plurality of cards having different sizes by one composite type card connector without any trouble even though there is no modification of the cards. Further, since the composite type card connector itself of the present invention can be of a flat and thin housing shape, it is suitably usable for information terminal devices or various electronic instruments such as a portable telephone, a game machine, a notebook type personal computer, a portable type audio set, a television set, a video deck, a digital camera or a music microphone.

In the composite type card connector of the present invention, the movable plate is formed of a plate-like member having left and right side portions bending downward and operates as a guide member movable obliquely upward and downward along a guide groove of the operating plate. Accordingly, it is possible to suitably use small and large cards having different sizes by one composite type card connector, the operating plate is adapted to move the movable plate obliquely upward by a guiding member when the second card is inserted. Accordingly, it is possible to use a plurality of cards having different sizes by one composite type card connector without any trouble even though there is no modification of the cards. Further, since the composite type card connector itself of the present invention can be of a flat and thin housing shape, it is suitably usable for information terminal devices or various electronic instruments such as a portable telephone, a game machine, a notebook type personal computer, a portable type audio set, a television set, a video deck, a digital camera or a music microphone.

In the composite type card connector of the present invention, the locking mechanism comprises a locking arm of a cantilever spring formed at least on one side of the cover member or the operating plate, and a slidable locking member having a projection with which is engaged a front end of the locking arm, and the locking member is movable in association with the movable plate. Accordingly, it is possible to realize a structure capable of preventing the small card from being forcibly released.

In the composite type card connector of the present invention further comprises an ejection mechanism having an ejection member for discharging the first and/or second card inserted in the card connector and a spring member for elastically deflecting the ejection member, wherein the ejection member is provided with a heart cam having a cam groove on the circumference thereof so that one end of a cam lever pivoted at the other end to the connector body is engaged with the cam groove. Accordingly, it is possible to favorably discharge the card by using the ejection member.

In the composite type card connector of the present invention, the stepped section has an upper stepped section and a lower stepped section. Accordingly, the card connector is simple in structure in correspondence with a size of the card.

In the composite type card connector of the present invention, a cross-section of the card-inserting opening taken in the direction orthogonal to the card-inserting direction is of a flat and inversely convex shape, and the stepped section is provided in a stair-like form on each of opposite sides thereof, a width between both the left and right upper stepped sections is larger than that between both the left and right lower stepped sections. Accordingly, it is possible to insert the card while identifying the card in accordance with the outer dimension thereof, an overall structure of the card connector can be flat and rigid.

In the composite type card connector of the present invention further comprises a card holding mechanism wherein a cantilever-like elastic member projected inward is provided in the vicinity of the card-inserting opening along the lower stepped section, for elastically pressing a lateral side of the first card. Accordingly, it is possible to favorably and simply manufacture the card-holding mechanism as well as to securely hold the small card.

In the composite type card connector of the present invention, the elastic member is a spring member of synthetic resinous material molded integral with the connector body. Accordingly, it is possible to manufacture the required parts at an inexpensive cost to reduce the production cost.

In the composite type card connector of the present invention, the spring member of synthetic resinous material is different in height between left and right ones. Accordingly, it is possible to obtain a favorable structure suitably in correspondence to the shape of the card.

In the composite card connector of the present invention, the elastic member is a spring member of metallic material molded or press-fit into the connector body. Accordingly, it is possible to simply and assuredly manufacture the card connector and improve the production efficiency.

In the composite card connector of the present invention, a guide slope is provided in one of the upper stepped sections, for guiding the first card to a required position. Accordingly, it is possible to securely and smoothly guide the first small card to the required position.

As described above, according to the composite type card connector of the present invention, the connector body having the card-inserting opening is combined with the cover member to form a housing, in the interior of which are arranged the first contacts for the small card and the second contacts for the large card. The card-mounting section is switched by the switching operation mechanism having the movable plate and the operating plate. Thereby, it is possible to commonly use a plurality of kinds of cards having different cross-sections and dimensions by the same composite type card connector without any troubles even though there is no modification in cards. Also, it is possible to suitably identify the large and small cards. The composite type card connector itself of the present invention is of a flat and thin housing shape and suitably used for information terminal devices or various electronic instruments such as a portable telephone, a telephone set, a notebook type personal computer, a portable audio set, a television set, a video deck, a digital camera or a music microphone.

According to the composite type card connector of the present invention, the connector body having the card-inserting opening is combined with the cover member to form a housing, in the interior of which are arranged the first contacts for the small card and the second contacts for the large card. The card-mounting section is switched by the switching operation mechanism having the movable plate and the operating plate. Thereby, it is possible to commonly use a plurality of kinds of cards having different cross-sections and dimensions by the same composite type card connector.

The above and other objects, effects, features and advantages of the present invention will become more apparent from the following description of embodiments thereof taken in conjunction with the accompanying drawings.

DETAILED DESCRIPTION OF PREFERRED EMBODIMENTS (First Embodiment)

Figure 1:
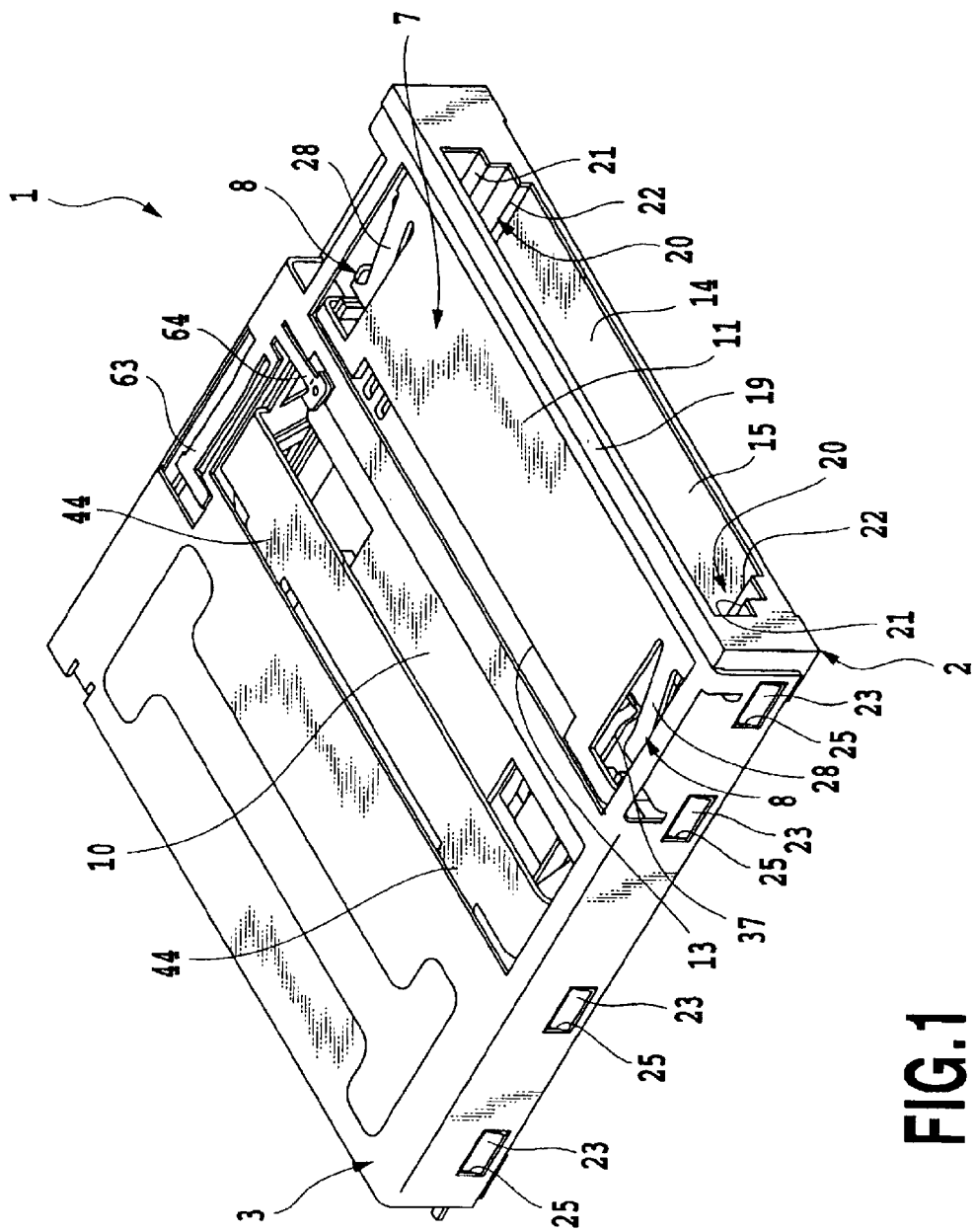
FIG. 1 is an overall perspective view of the composite type card connector of a first embodiment of the present invention as seen from a card-inserting opening side thereof.
Figure 2:
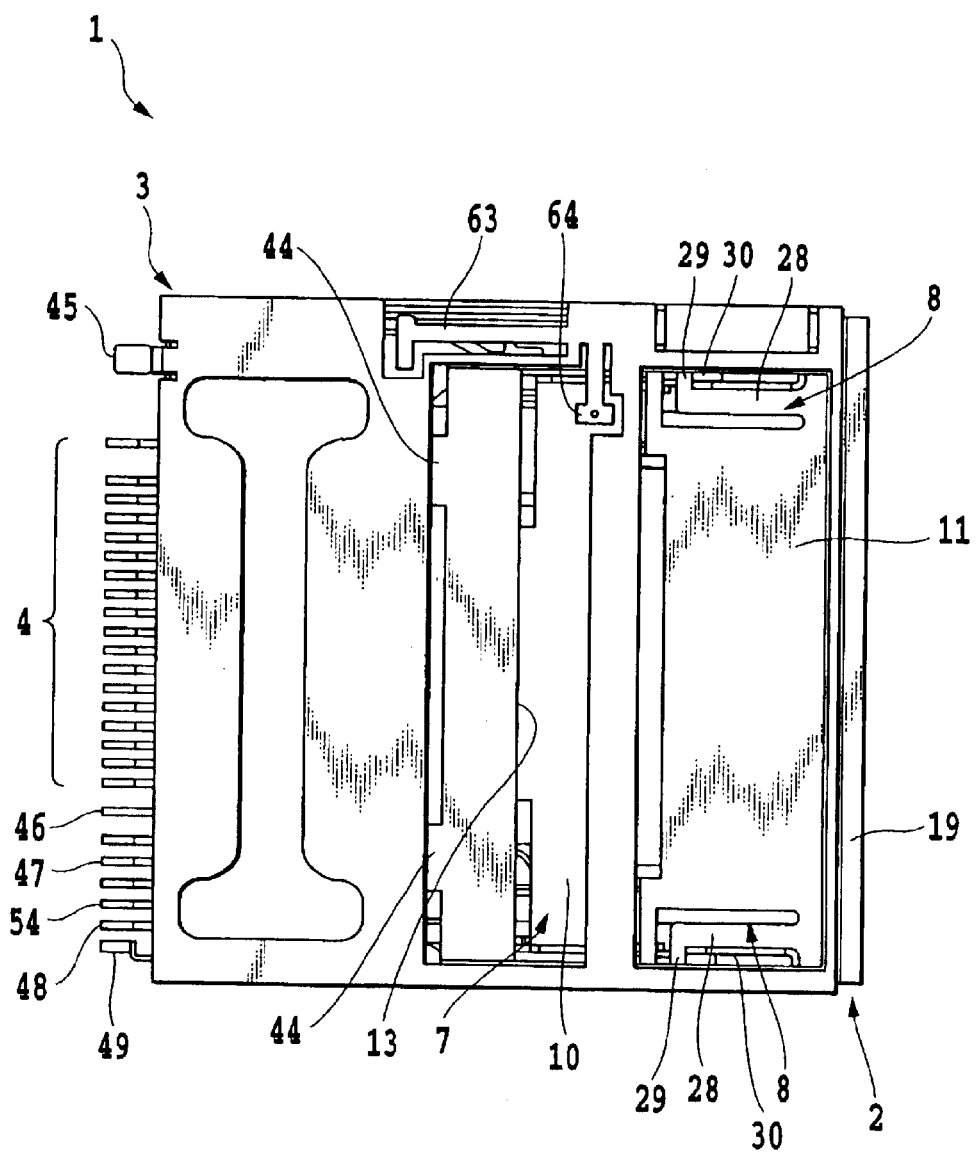
FIG. 2 is a plan view of the composite type card connector of the present invention shown in FIG. 1.
Figure 3:
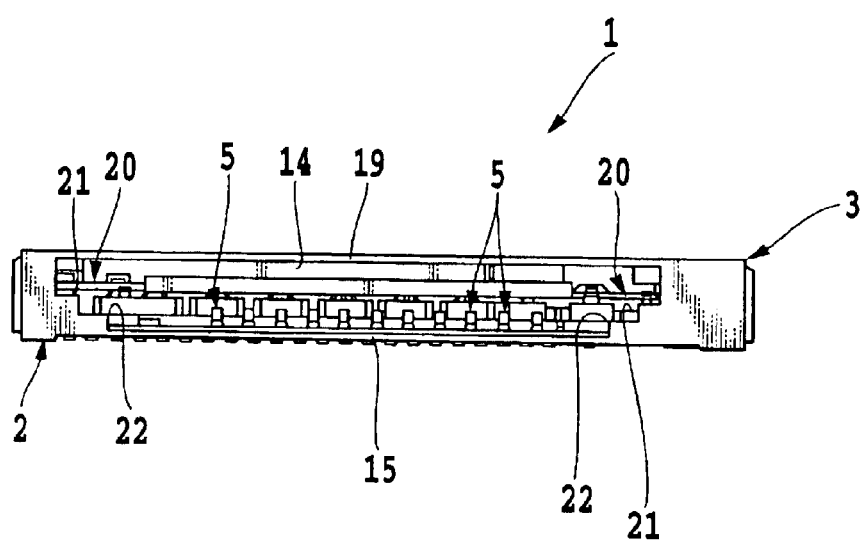
FIG. 3 is an end view of the composite type card connector of the present invention shown in FIG. 1 as seen from the card-inserting opening side thereof.
Figure 4:
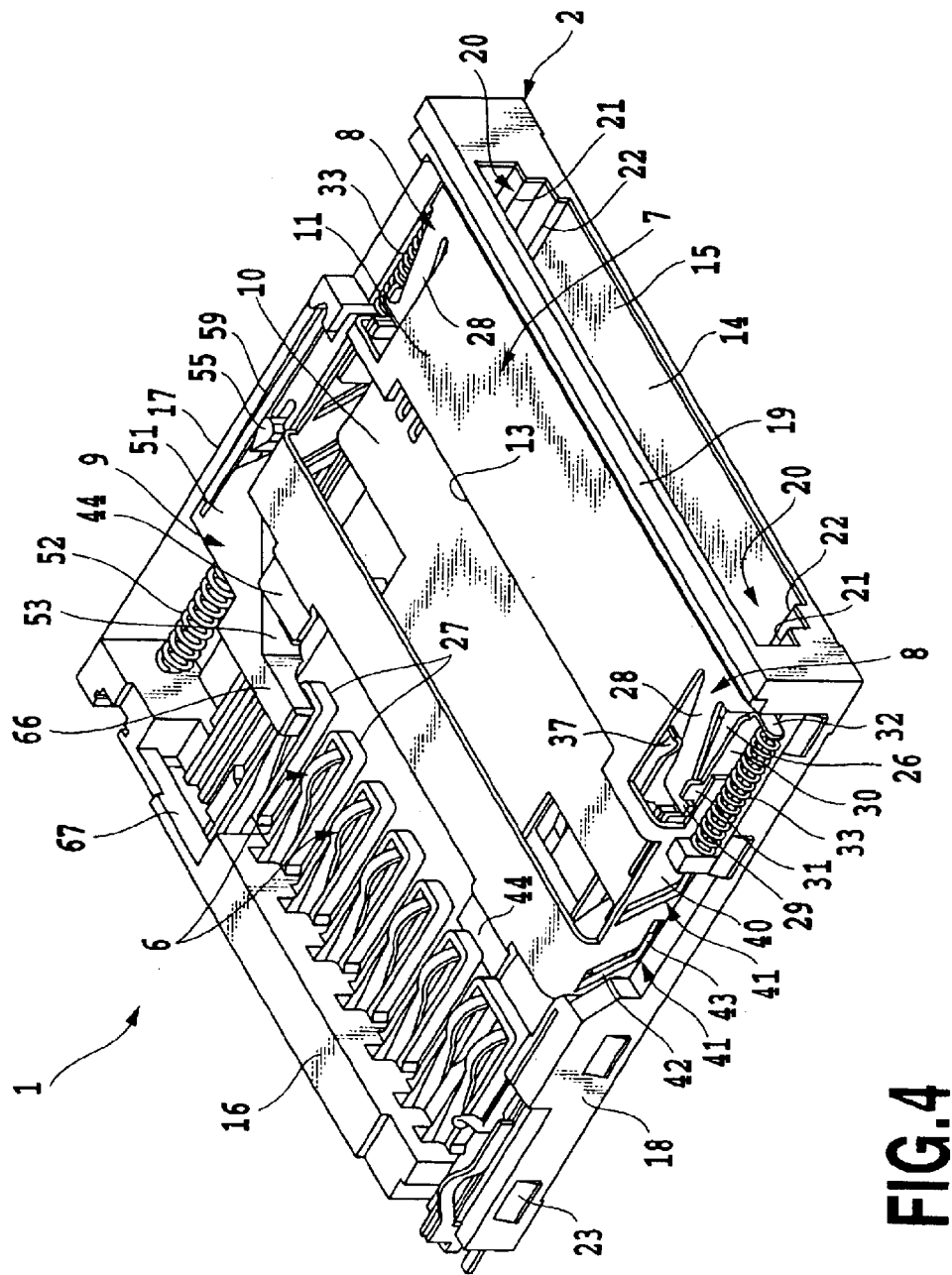
FIG. 4 is a perspective view similar to FIG. 1 from which is removed a cover.
Figure 5:
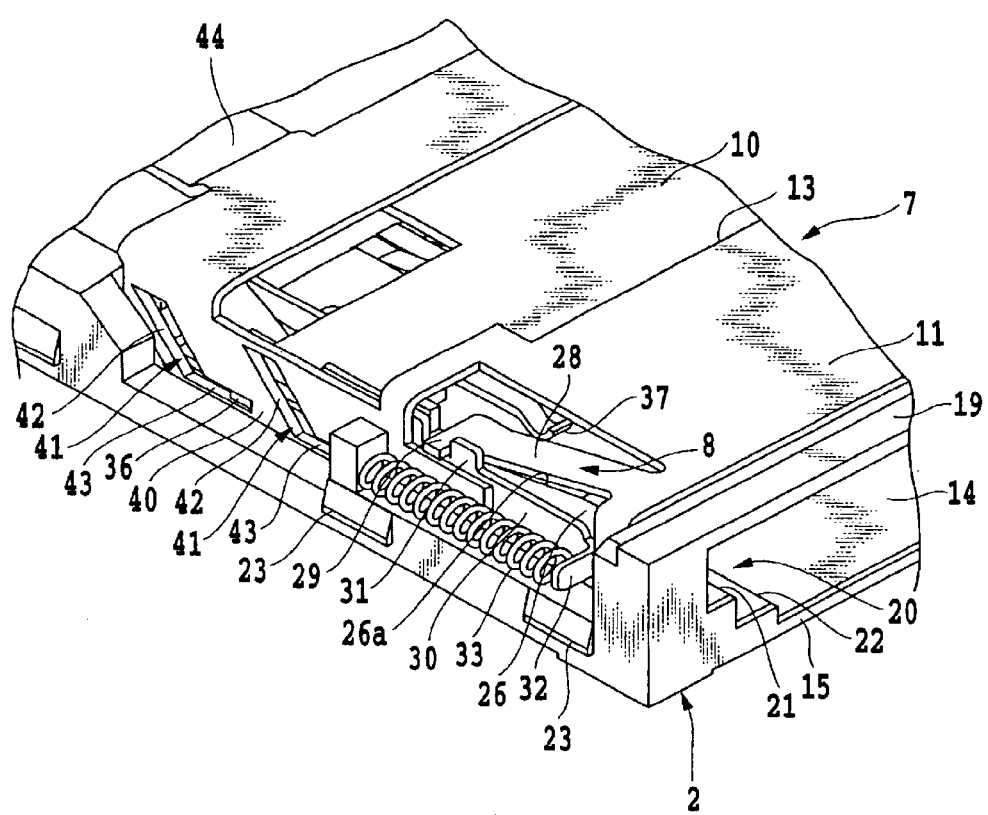
FIG. 5 is an enlarged perspective view of a locking mechanism of the composite type card connector of the present invention shown in FIG. 4.
Figure 6:
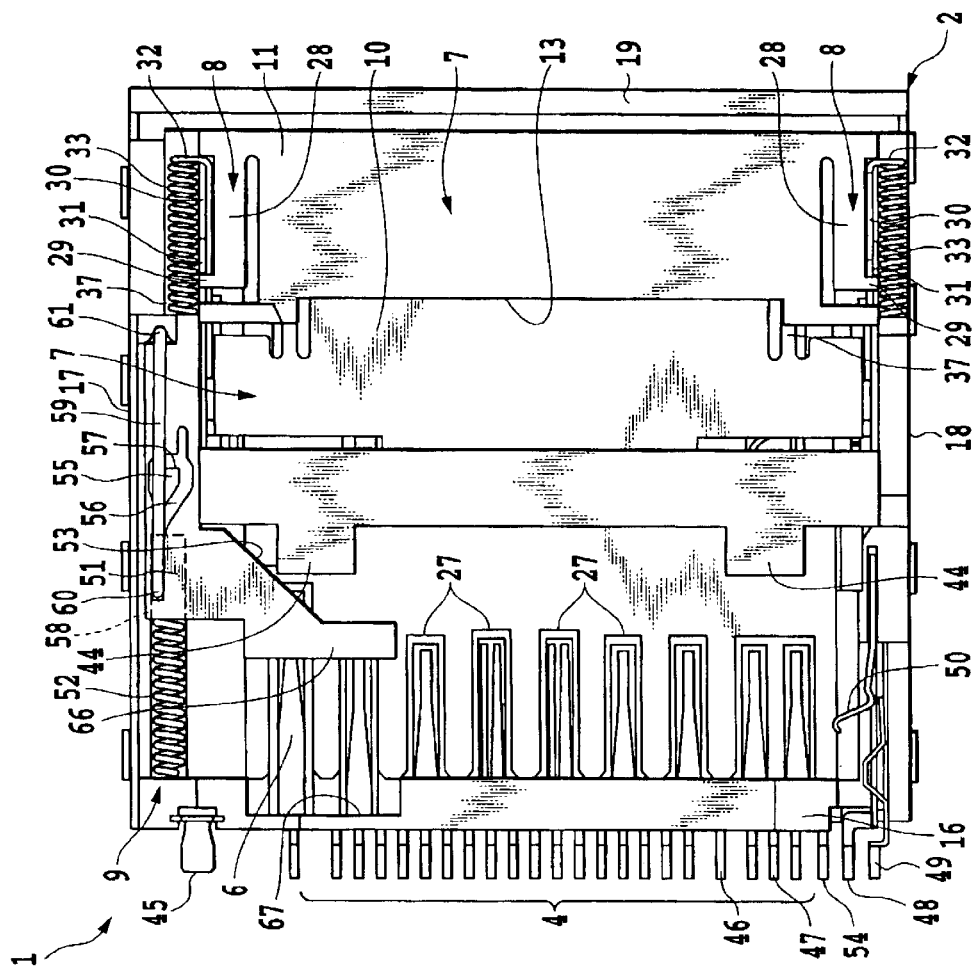
FIG. 6 is a plan view of the composite type card connector of the present invention shown in FIG. 4 from which is removed the cover member.
Figure 7:
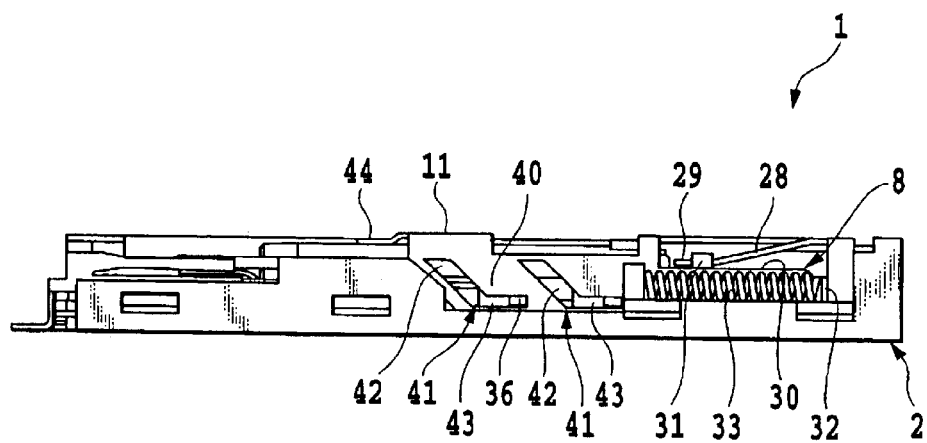
FIG. 7 is a side view of the composite type card connector of the present invention shown in FIG. 6 from which is removed the cover member.
Figure 8:
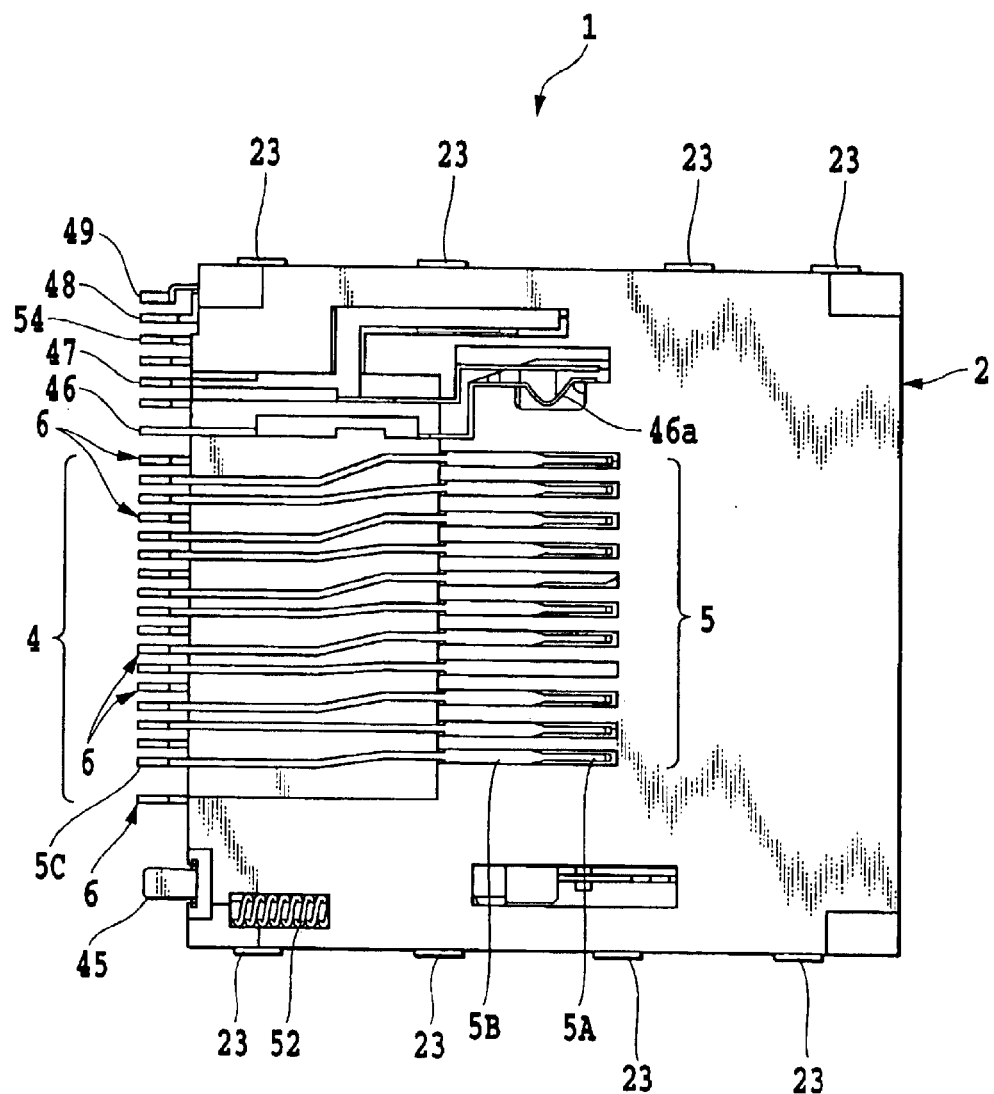
FIG. 8 is a bottom view of the composite type card connector of the present invention shown in FIG. 6 from which is removed the cover member.
Figure 9:
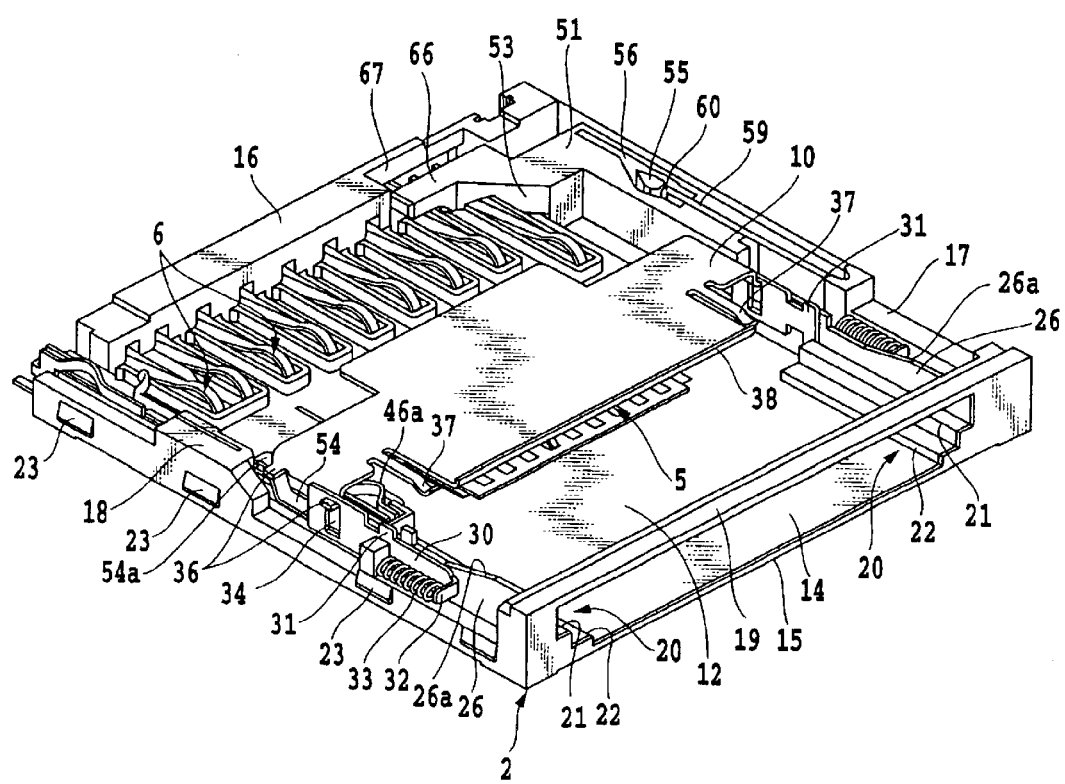
FIG. 9 is a perspective view of the composite type card connector of the present invention shown in FIG. 4 from which are removed not only the cover member but also an operation plate.
Figure 10:
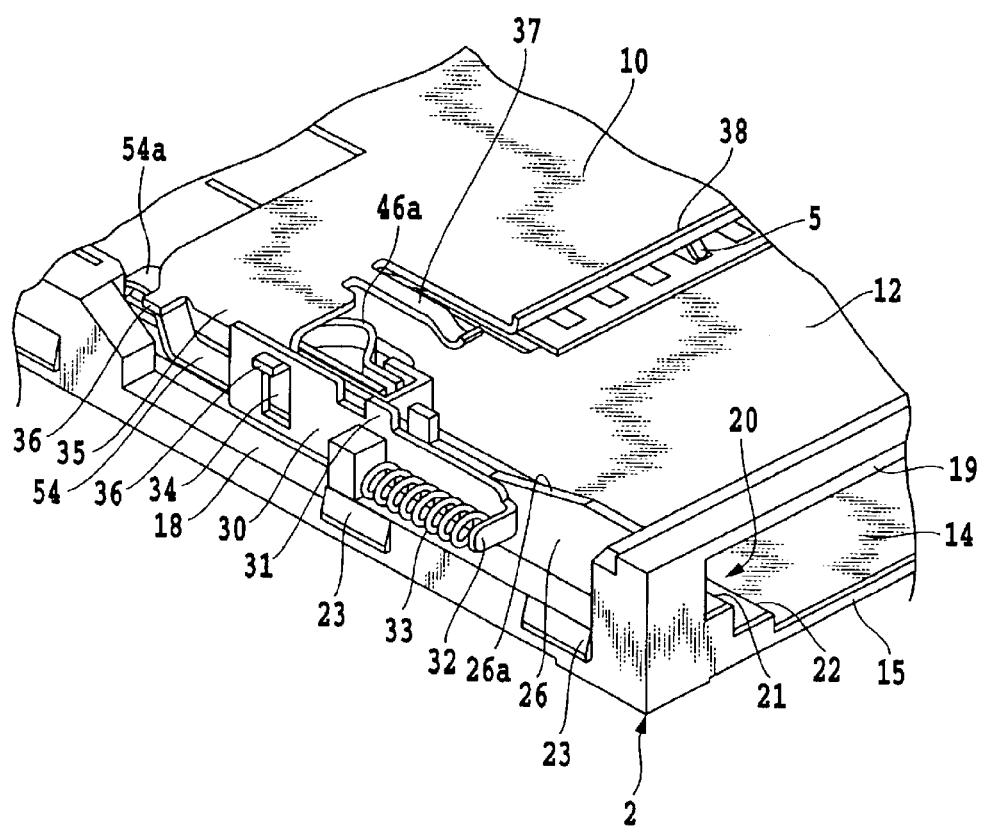
FIG. 10 is an enlarged perspective view of a locking member in the locking mechanism shown in FIG. 9.

FIGS. 1 to 10 illustrate a first embodiment of the composite type card connector of the present invention wherein FIG. 1 is an overall perspective view of the composite type card connector of the present invention as seen from a card-inserting opening side thereof; FIG. 2 is a plan view thereof; FIG. 3 is an end view thereof as seen from the card-inserting opening side thereof; FIG. 4 is a perspective view similar to FIG. 1 from which is removed a cover; FIG. 5 is an enlarged perspective view of a locking mechanism of the composite type card connector of the present invention shown in FIG. 4; FIG. 6 is a plan view of the composite type card connector of the present invention from which is removed the cover member; FIG. 7 is a side view thereof; FIG. 8 is a bottom view thereof as seen from underside; FIG. 9 is a perspective view of the inventive complex type card connector shown in FIG. 4 from which are removed not only the cover but also an operating plate; and FIG. 10 is an enlarged perspective view of locking member in the locking mechanism shown in FIG. 9.

As shown in FIGS. 1 to 10, the composite type card connector of the present invention 1 is capable of commonly using both a thinner and smaller card and a thicker and larger card. These cards used in the present invention are referred merely to as "a small card" and "a large card", respectively, hereinafter.

As shown in FIG. 1, the composite type card connector of the present invention 1 includes a connector body 2, a cover member 3, a plurality of contacts 4 formed of first contact members 5 and second contact members 6, a switching operation mechanism 7, a locking mechanism 8 and an ejection mechanism 9. The composite type card connector of the present invention 1 is formed as a housing-shaped flat and thin case by the combination of the connector body 2 and the cover member 3, and a card mounting section 12 is provided in the interior thereof, into which are inserted and mounted the small and large cards.

The composite type card connector of the present invention 1 of the above-mentioned kind is used while being mounted, for example, to an information terminal device or others.

Also, in the composite type card connector of the present invention 1, one side of the card-mounting section 12 is opened to define a card-inserting opening 14 by a step-shaped frame member 19. Further, on each of opposite sides of a front area of the card-mounting section 12 consecutive to the card-inserting opening 12, a stair-like stepped portion 20 is provided so that the front area of the card-mounting section 12 has a stepwise cross-section narrowing toward a flat bottom thereof, and thus the small card A and the large card B can be inserted into it. Such a stepped portion 20 consists of an upper stepped section 21 and a lower stepped section 22 to form guide passages for the small card A and the large card B in a two-stairs shape.

Accordingly, as described later, when the small card A is used, it is inserted into the lower stepped section 22 having the narrowest width and retained there. On the other hand, when the large card B is used, it is inserted into the upper stepped section 21 having the widest width and retained there. Opposite sides of the card-inserting opening 14 and the card-mounting section 12 consecutive thereto are of a stair-like shape so that the lower part of the card-inserting opening 14 and the card-mounting section 12 consecutive thereto is used for the small card A, and the upper part thereof is used for the large card B.

In such a manner, the upper stepped section 21 having a larger width is used for the large card B, wherein the large card B is inserted into the upper stepped section 21 so that the step-shaped portion of the large card B is located at the upper stepped section 21 while being engaged therewith. Further, on the outside of the upper stepped section 21, a guide wall 26 is provided to guide a side of the step-shaped portion of the large card B. This guide wall 26 has a cut slope 26a in part of an upper portion thereof so that the locking engagement of the locking arm 28 with the slope 26a at a lower position is not disturbed when the small card A is inserted to depress the locking arm 28 downward due to the elastic deformation. Accordingly, when a claw 29 of the locking arm 28 is engaged with a projection 31 of a locking member 30, the locking arm 28 is located along the cut slope 26a.

Further, in the composite card connector 1 of the present invention, the other side of the card-mounting section 12 of the connector body 2 is closed by an end wall 16, along which are arranged a plurality of contacts 4 consisting of first contact members 5 and second contact members 6. The first contact member 5 and the second contact member 6 have terminals 5C and 6C, respectively, to be connected with terminals of an external information terminal device or device. The first contact members 5 for the small card A are arranged so that contact sections 5A are provided approximately at an center of the connector body 2, while the second contact members 6 for the large card B are arranged along the end wall 16 so that two of the first contact members 5 are approximately alternate with one of the second contact members 6.

The second contact members 6 in these contacts 4 are provided in a rear area of the connector body 2 to be located on independent supports 27 along the end wall 16, so that the contact of the contact section 6A of the contact member 6 with a contact pad of the large card B is enhanced in addition to the independence of the contact pad of the large card B as well as the large card B is prevented from being inversely inserted.

Besides these contacts 4, as apparently shown in FIG. 8, a card-identification contact 47 for the small card, a card-identification contact 48 for the large card and a write-protection contact 54 for protecting data from being erroneously erased are provided. The write-protection contact 54 has, in a front portion of the interior thereof, a projection 54a to be engaged with a write-protection contact key 70 or recess 71 of the large card B. Thereby, when the large card B is inserted and the projection 54a of the write-protection contact 54 is pushed in correspondence to a set position of the write-protection contact key 70 of the large card B, the projection 54a is brought into contact with the card-identification contact 47 which is a common contact.

As illustrated, one of the card-identification contact 47 for the small card A is preferably formed to be also used as the card-identification contact for the large card B or the write-protection contact 54. In the illustrated embodiment of the present invention, the card-identification contact 47 is selected for this purpose.

A cantilever-like spring member 50 is provided in parallel to the card-identification contacts 47, 48 and the write-protection contact 54 and operates as a braking member for preventing the large card B from coming off when it is inserted. Further, in addition to these card-identification contacts 47, 48, a switch contact 49 is provided to be operative by the spring member 50 when the large card B is inserted. Moreover, a tab 45 is provided for soldering and grounding various kinds of these contacts to a substrate. Preferably, a spring contact 46 having a projection 46a is provided as a movable piece for the card identification.

In the composite type card connector 1 of the present invention, the connector body 2 has latch projections 23 to be engageable with windows 25 of opposite side bending walls 24 of the cover member 3.

In the composite type connector 1 of the present invention described above, the connector body 2 is molded with insulation material such as suitable synthetic resinous material and combined with the cover member 3 made of metallic sheet material to form a flat case.

In the composite type card connector 1 of the present invention, the smaller card A or the large card B is inserted from the card-inserting opening 14 of the composite type card connector 1 and mounted to the interior of the card mounting section 12. The first contact members 5 and the second contact members 6 are arranged at required positions with necessary heights to be connected to pads arranged at a forward end of a lower surface of the small card A or the large card B.

In the first contact member 5 and the second contact member 6, the semicircular contact sections 5A and 6A bending upward are formed at inner free ends thereof. These contact sections 5A and 6A are formed to be elastically brought into contact with the pads of the small card A or the large card B inserted from the card-inserting opening 14 at required positions. In this regard, the second contact members 6 are arranged so that the contact section 6A is located on the support 27 provided rearward of a base 15 of the socket body 2 and also, as illustrated, bends at the terminal 6C on the out end side approximately at a right angle and fixed to the end wall 16 of the socket body 2 by a one-piece molding. The second contact member 6 has the terminal 6C to be connected to an external device in a similar manner as the first contact member 5. The first contact member 5 is fixed to the base 15 of the connector body 2 in a middle portion closer to the front end.

In this regard, in this embodiment, the cards A and B used for the composite type card connector 1 of the present invention are suitably "Memory Stick Duo" (registered trade mark) as the small card and "Memory Stick" (registered trade mark) as the large card. However, the present invention should not be limited to these cards but other memory cards such as SD card, IC card or SIM card may be, of course, used.

As illustrated, in the composite type card connector of the present invention, a movable plate 10 of the switching operation mechanism 7 is provided approximately at a center of the card mounting section 12 and an operating plate 11 is provided at a position on the card-inserting opening 14 side thereof. The operating plate 11 has an opening 13 approximately at a center thereof. The locking arm 28 of the locking mechanism 8 is provided on each of opposite sides of the operating plate 11 and a locking claw 29 laterally projects from a front end of the locking arm 28. The locking claw 29 of the locking arm 28 is formed to be engageable with a projection 31 of a slidable locking member 30.

The locking member 30 is formed by an elongate plate member and has the projection 31 projected upward from approximately at a center thereof and a spring-engagement part 31 at one end thereof, to which is engaged one end of a spring member 33 for elastically biasing the locking member 30. The locking member 30 is disposed-so that a flat surface of the plate member is located at a vertical position. In this regard, the locking arm 28 of the locking mechanism 8 may be formed in the cover member 3 other than the operating plate 11.

The movable plate 10 of the switching operation mechanism 5 has a bending portion 35 on each of opposite sides thereof formed by bending an elongate plate member downward. A plurality of projections 36 are projected outward from the bending portion 35, and a card presser 37 is provided at a position slightly inside thereof. An front edge of the movable plate 10 is slightly curved upward to form a curved portion 38 which protects a forward end of the small card A or the large card B and enhances the guiding of the small card A or the large card B to the underside of the movable plate 10.

In the movable plate 10, two projections 36 provided on each of the opposite sides are engaged in guide grooves 41 extending in the oblique direction formed in a bending portion 40 of the operating plate 11. In this regard, forward one of these projections is also engaged with a vertical groove 34 in the locking member 30 so that the forward projection 36 moves upward along the vertical groove 34 when the movable plate 10 moves upward.

As illustrated, the guide groove 41 in the operating plate 11 is of a generally slanted L-shape having a slope section 42 extending obliquely upward and a horizontal section 43 extending in the horizontal direction. Accordingly, when the large card B is inserted, a forward end of the large card B is first brought into contact with the curved portion 38 at a front end of the movable plate 10 to further push the movable plate 10 inward. Thereby, the projections provided on the opposite sides of the movable plate 10 is moved in the horizontal direction along the horizontal section 43 of the guide groove 43, and then pushed obliquely upward along the slope section 42 of the guide groove 41. Thus, the movable plate 10 is pushed upward, whereby the large card B is pushed to be soon located beneath the movable plate 10. At this time, since the locking arm 28 of the operating plate 11 is pushed upward by the large card B, the claw 29 of the locking arm 28 is released from the projection 31 of the locking member 30 in the locking mechanism 8 to unlock the locking mechanism 8, whereby the locking member 30 slides due to the pulling force of the spring member 33 in the locking member 30.

The card presser 37 suitably presses the mounted small card A or large card B not to come off from the card connector.

Similarly, card pressers 44 are provided at a rear end of the operating plate 11 to suitably press the inserted large card B not to come off from the card connector.

As illustrated, in the composite type card connector 1 of the present invention, the cantilever spring-like locking arm 28 of the locking mechanism 8 is provided on each of the opposite sides of the operating plate 11 within the card-inserting opening 14, and the locking member 30 having a locking projection 31 engageable with the locking claw 29 provided at a front end of the locking arm 28 is provided in a stable state.

Accordingly, when the large card B is inserted, the forward end of the large card B first pushes the front end of the locking arm 28 upward to release the locking claw 29 from the projection 31 of the locking member 30, whereby the locking member 30 becomes slidable. At this time, since the forward end of the large card B further pushes the curved portion 38 at the front end of the movable plate 10, the projection 36 is movable along the horizontal section 43 and the slope section 42 of the guide groove 41, whereby the movable plate 10 is pushed upward by the large card B.

Thus, since the large card. B is favorably introduced to the underside of the movable plate 10 and further deeply inside, an ejection member 51 of the ejection mechanism 9 is pushed by the forward end of the large card B until a front end surface of a presser section 66 of the ejection member 51 enters a cut portion 67 in the end wall and abuts thereto. When the large card B has reached the final position, a hand is released at this position, whereby the ejection member 51 is slightly pushed back by a spring member 52 and a front end 60 of a cam lever 59 is held in a stable state in a recess 57 of a cam groove 56 around the circumference of a heart cam 55. Thus, the large card B is held in a stable state at this position.

In the above-mentioned composite type card connector 1 of the present invention, the ejection mechanism 9 is provided along a side wall 17 of the connector body 2. As illustrated, the ejection mechanism 9 is adapted to insert the large card B to be brought into contact with the second contact member 6 as well as to discharge the large card B.

The ejection mechanism 9 for discharging the large card B includes an ejection member 51 as a slider provided to slide along one of the side walls 17 of the connector body 2, a spring member 52 such as a coil spring elastically deformable by being pushed with this ejection member 51, the heart cam 55 formed on the upper surface of the ejection member 51, and a cam lever 59 engaged at one end thereof with a cam groove 56 formed around the heart cam 55. The heart cam 55 and/or the cam groove 56 may be provided not only on the upper surface of the ejection member 51 but also on the side surface thereof.

At an inner end of the ejection member 51, a card-receiving section 53 engageable with a corner of the large card B is provided, and on a side of the ejection member 51 closer to the side wall 17, a recessed spring-accommodation section 58 is provided for receiving and accommodating one end of the spring member 52. The card-receiving section 53 of the ejection member 51 is formed to receive the large card B which corners are cut or chamfered and suitably engageable therewith so that the large card B is prevented from being inserted upside down. Accordingly, when the large card. B is inserted upside down, corners of the large card B which have not been cut or chamfered abut to the card-receiving section 53, whereby both the members are not matched with each other and thus the ejection member 51 is not operative. Thus, the large card B is presented from being inserted upside down.

Also, the other end 61 of the cam lever 59 is attached in a rotatable manner to an extended portion of the side wall 17 in the connector body 2. Accordingly, when the large card B is inserted and pushed inside to slide the ejection member 51, the ejection member 51 relatively moves while one end 60 of the cam lever 59 moves along the cam groove 56. Thereby, if a hand is released when the large card B has been inserted and pushed further deeply into the card mounting section 12 until the ejection member 51 abuts to the end wall 16, the large card B is slightly pushed back and the end 60 of the cam lever 59 is located in the recess 57 of a head portion of the heart cam 55 and fixed there.

Since the ejection member 51 is pushed by the spring member 52 at a position of the recess 56, it is held approximately in a fixed state at a position wherein the end 60 of the cam lever 59 abuts to the recess 57. Thereby, the inserted large card B is fixed at the inserted position so that the pad section of the large card B is favorably brought into contact with the contact section 6A of the second contact member 6.

A cam lever presser 63 of a cantilever-like spring is provided in the cover member 3 to elastically push the cam lever 59 so that the end 60 of the cam lever 59 is favorably held in the cam groove 56 not to fly out therefrom. Similarly, a movable plate presser 64 of a cantilever-like spring is also provided in the cover member 3 for pressing and holding the movable plate 10.

To discharge and take out the large card B from the composite type card connector 1 of the present invention after a predetermined object has been achieved, the large card B mounted to the composite type card connector 1 is once slightly pushed back to release the latching engagement of the large card B, and then taken out. That is, when the large card B mounted into the composite type card connector 1 is once slightly pushed back, the end 60 of the cam lever 59 located in the recess 57 of the heart cam 55 is apart from the recess 57 and moves in the lateral direction to be out of the recess 57.

Thereby, since the end 60 of the cam lever 59 becomes free to follow the cam groove 56, the ejection member 51 is pushed and slid by the spring member 54. Accordingly, the ejection member 51 moves to a midway of the composite type card connector 1 by the action of the spring member 54, whereby a half of the large card B emerges outside from the card connector.

Subsequently, the large card B is pulled out by gripping the exposed end thereof with fingers. Thus, the large card B is smoothly and completely discharged from the composite type card connector 1. When the large card B has been completely discharged from the composite type card connector 1, the operating plate 11 is pushed back to the initial position, and the movable plate 10 is moved to the lower position along the guide groove 41, at which the locking member 30 of the locking mechanism 8 slides to the original locked position and the locking claw 29 of the locking arm 28 is engaged with the projection 31 of the locking member 30 to latch and fix it. Accordingly, the movable plate 10 also descends to the initial lower position.

In the composite type card connector 1 of the present invention thus structured, the operation will be described below when the small card A and the large card B having different sizes are actually used.

Figure 11:
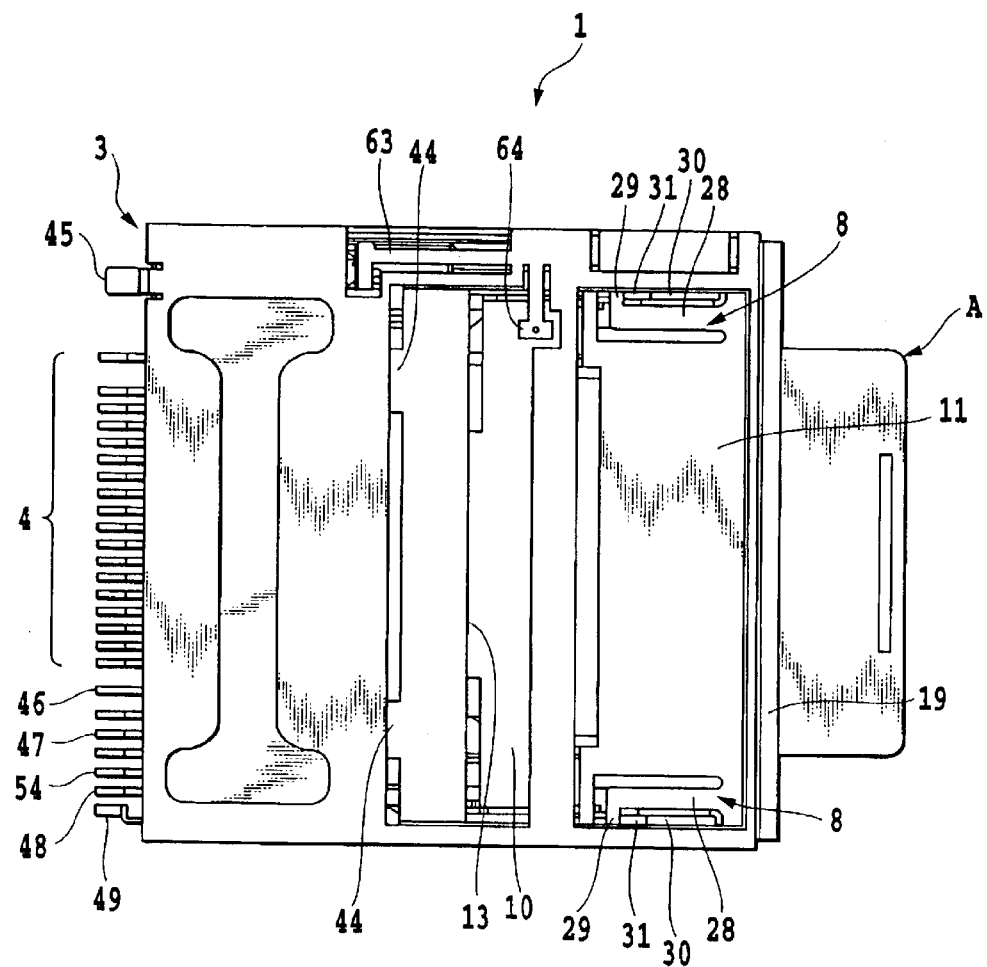
FIG. 11 is an overall plan view of the composite type card connector of the present invention shown in FIG. 1 when the small card is inserted therein, from which the cover member is removed.
Figure 12:
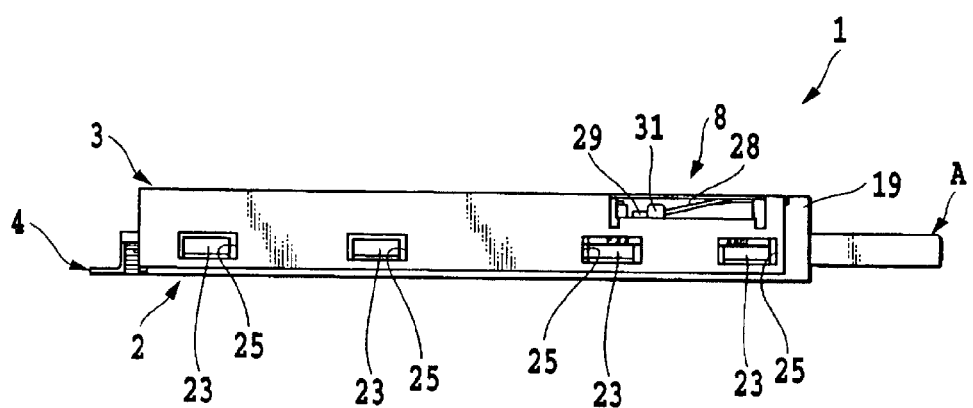
FIG. 12 is a side view of the composite type card connector of the present invention shown in FIG. 11.
Figure 13:
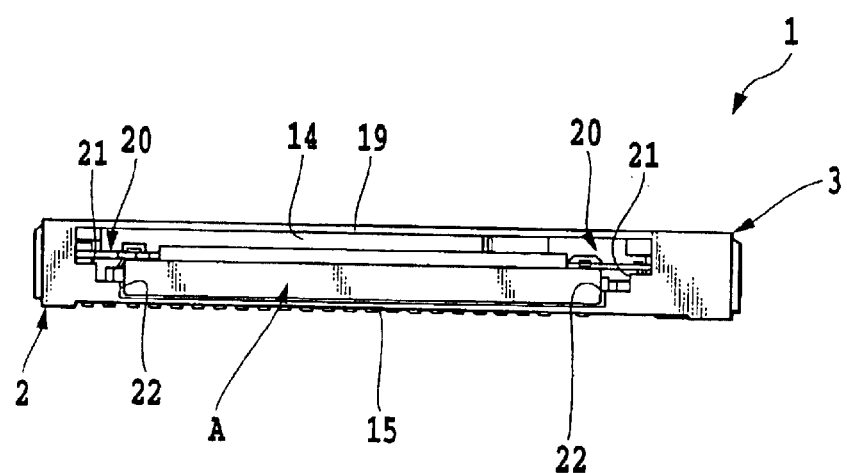
FIG. 13 is an end view of the composite type card connector of the present invention shown in FIG. 11 as seen from the card-inserting opening.
Figure 14:
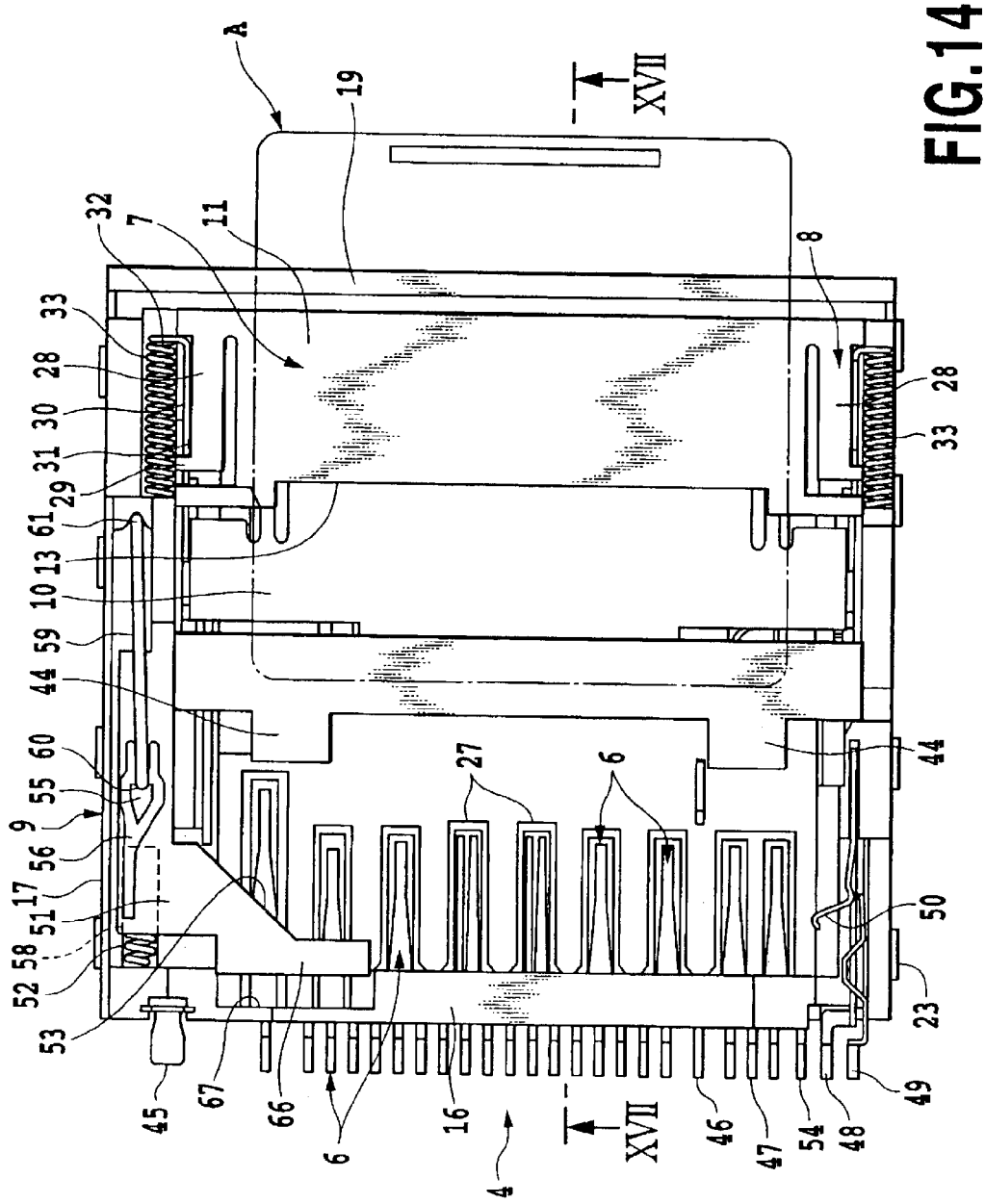
FIG. 14 is a plan view of the composite type card connector of the present invention shown in FIG. 11 when the small card is inserted therein, from which the cover member is removed.
Figure 15:
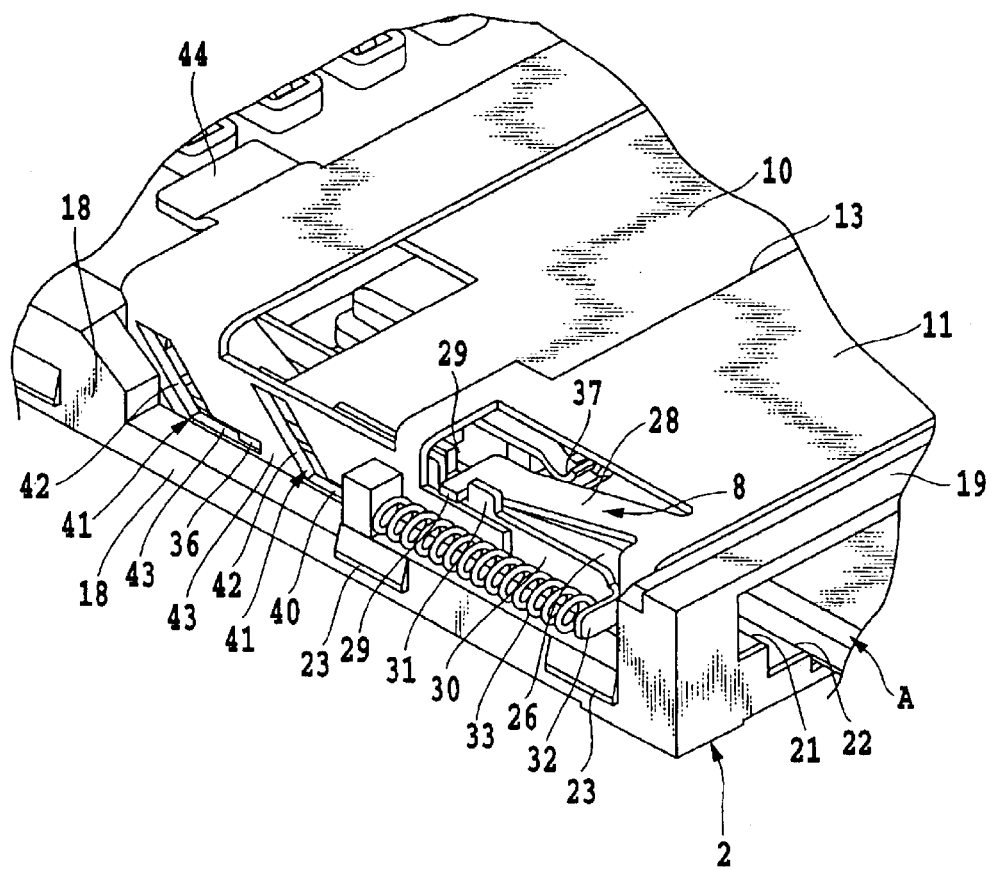
FIG. 15 is an enlarged view of the locking mechanism in the composite type card connector of the present invention shown in FIG. 14.
Figure 16:
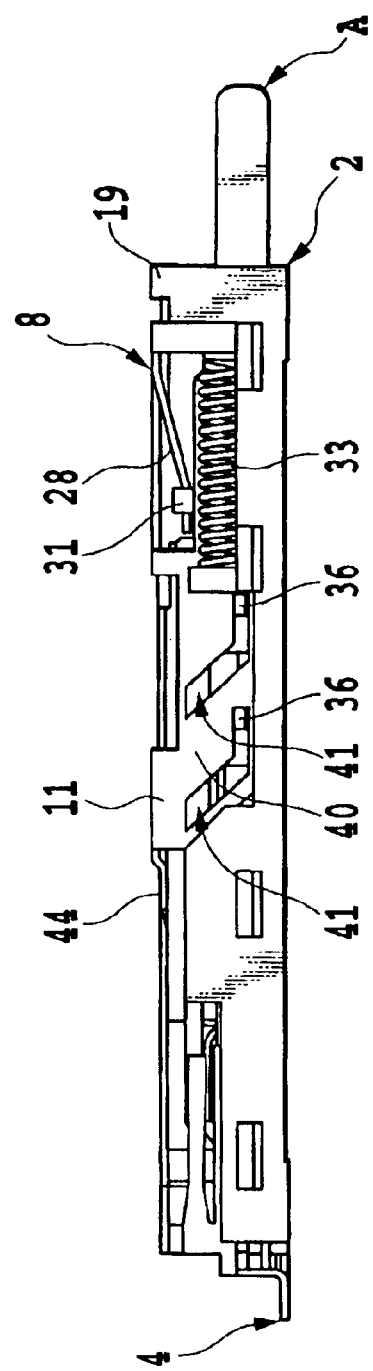
FIG. 16 is a side view of the composite type card connector shown in FIG. 14.
Figure 17:
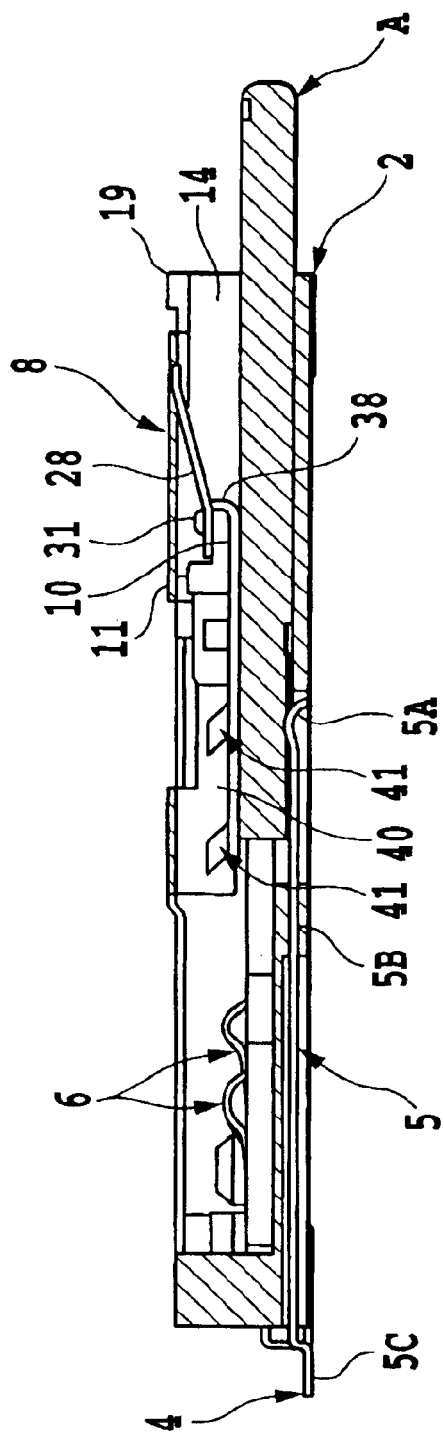
FIG. 17 is a sectional view taken along a line XVII—XVII in FIG. 14.
Figure 18:
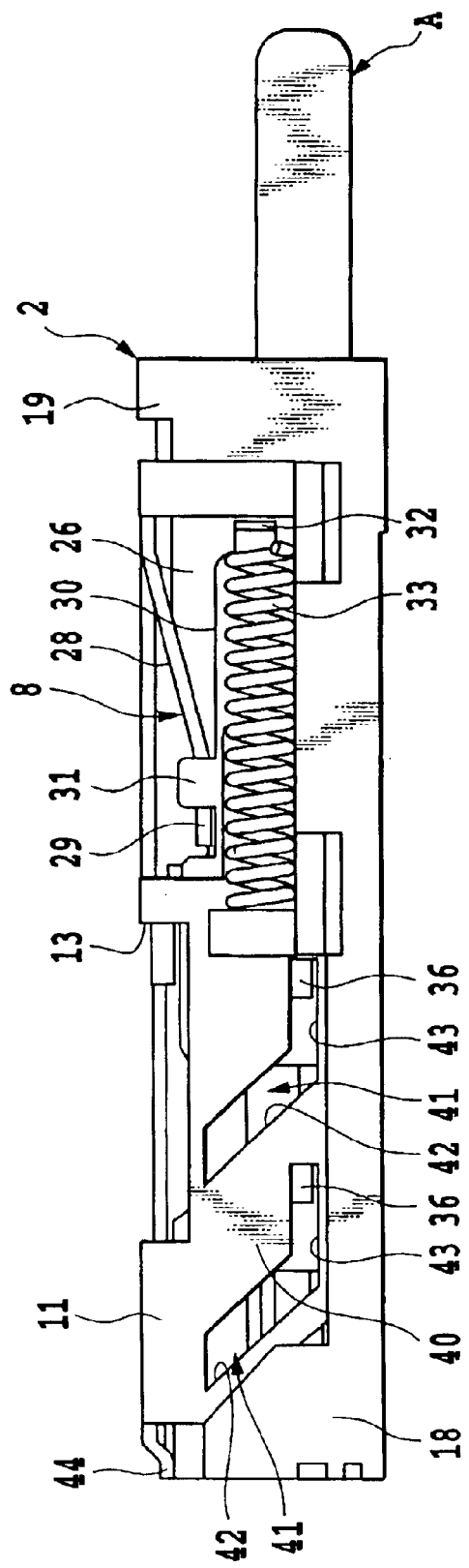
FIG. 18 is an enlarged view of the locking mechanism shown in FIG. 16.
Figure 19:
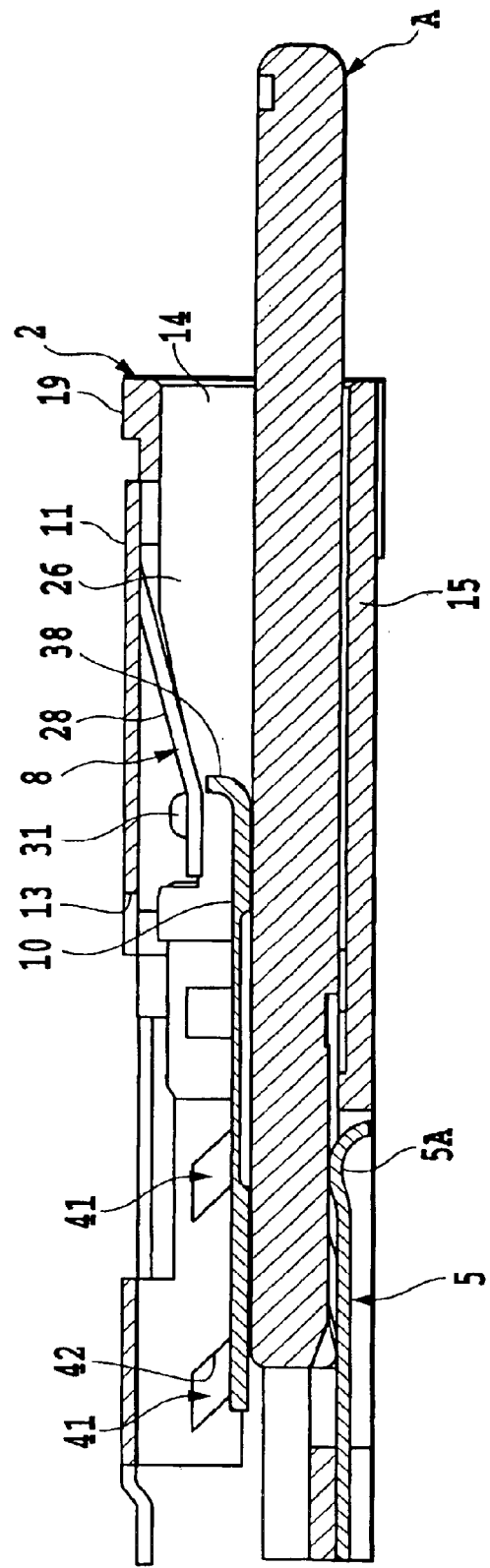
FIG. 19 is an enlarged sectional view of the locking mechanism shown in FIG. 17.

FIGS. 11 to 19 illustrate the composite type card connector of the present invention when the small card is used, wherein FIG. 11 is an overall plan view of the composite type card connector of the present invention when the small card is inserted therein, from which the cover member is removed; FIG. 12 is a side view thereof; FIG. 13 is an end view thereof as seen from the card-inserting opening; FIG. 14 is a similar view as FIG. 11 which is an overall plan view of the composite type card connector of the present invention when the small card is inserted therein, from which the cover member is removed; FIG. 15 is an enlarged view of the locking mechanism in the composite type card connector of the present invention; FIG. 16 is a side view of the composite type card connector of the present invention shown in FIG. 14 when the cover member is removed; FIG. 17 is a sectional view taken along a line XVII—XVII in FIG. 14; FIG. 18 is an enlarged view of the locking mechanism shown in FIG. 16; and FIG. 19 is an enlarged sectional view of the locking mechanism shown in FIG. 17.

First, when the small card A is used, as shown in FIGS. 11 to 19, the small card A is inserted from the card-inserting opening 14 into the composite card connector 1 of the present invention.

The small card A is a card having smaller dimensions in thickness, length and width as illustrated. The width of the small card A in this case is approximately equal to or slightly smaller than a normal width between the lower stepped sections 22 in the card-inserting opening 14 of the composite type card connector 1 of the present invention. Accordingly, when the small card A is inserted from card-inserting opening 14 into the composite type card connector 1 as illustrated, it is possible to smoothly insert the same beneath the movable plate 10 without contact therewith, whereby the small card A can be held between the lower stepped sections 22 beneath the movable plate 10 by means of the movable plate 10. The movable plate 10 is firmly held at the lower position by the operating plate 11, and the locking member 30 is locked at a locked position by the locking arm 28, in which the locking claw 29 is engaged with the projection 31 of the locking member 30 in the locked state.

In this state, the small card A is inserted beneath the movable plate 10 so that the pad section of the small card A at a forward end thereof is brought into contact with the contact section 5A of the first contact member 5. In such a state, the small card A having a small thickness is favorably held within the composite type card connector 1 by the movable plate 10 and freely withdrawn therefrom. The small card A firmly inserted into the interior of the composite type card connector 1 of the present invention is engaged with the projection 46a of the spring contact 46, whereby the card identification is carried out. In such a manner, the small card A is inserted and performs the predetermined object.

When the small card A is taken out, the end of the small card A is gripped by fingers and pulled out from the connector 1.

Next, the operation will be described below when the large card B is used together with the inventive composite card connector 1.

Figure 20:
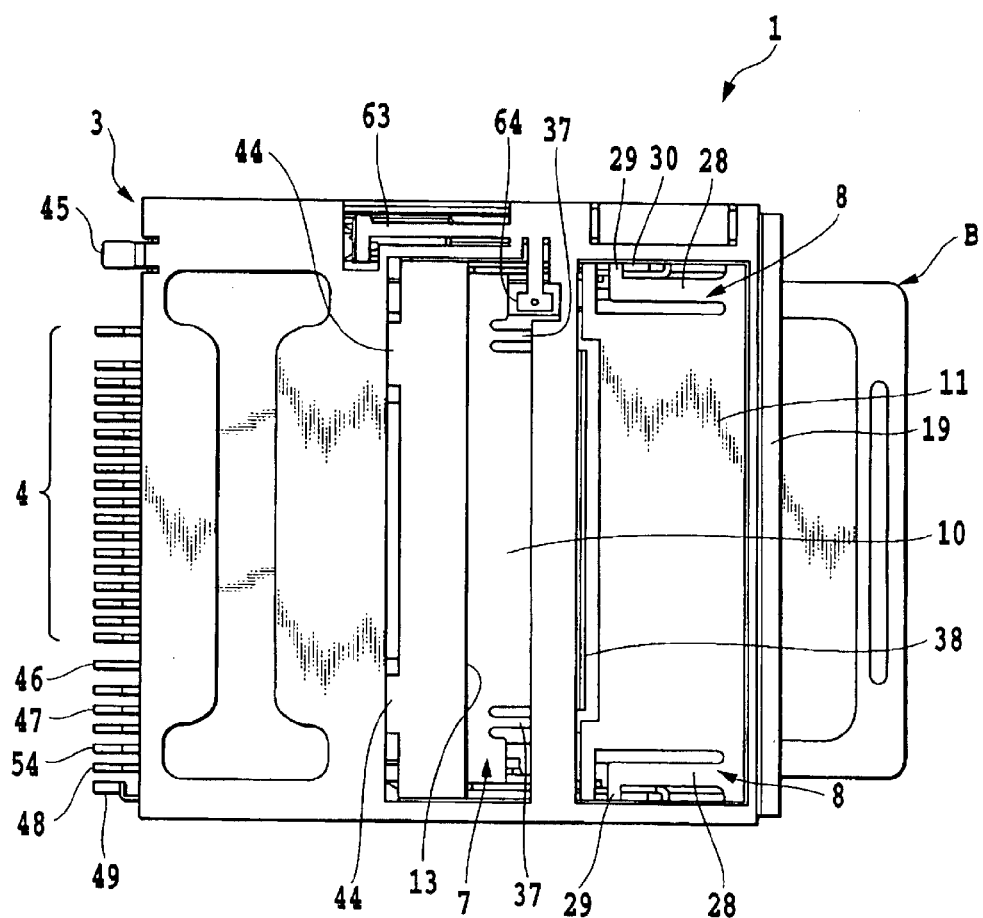
FIG. 20 is an overall plan view of the composite type card connector of the present-invention when the large card is inserted therein, from which the cover member is removed.
Figure 21:
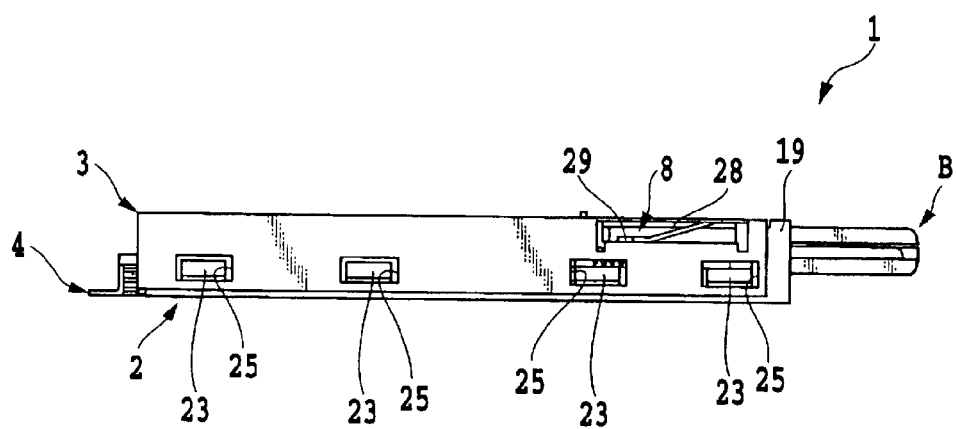
FIG. 21 is a side view of FIG. 20.
Figure 22:
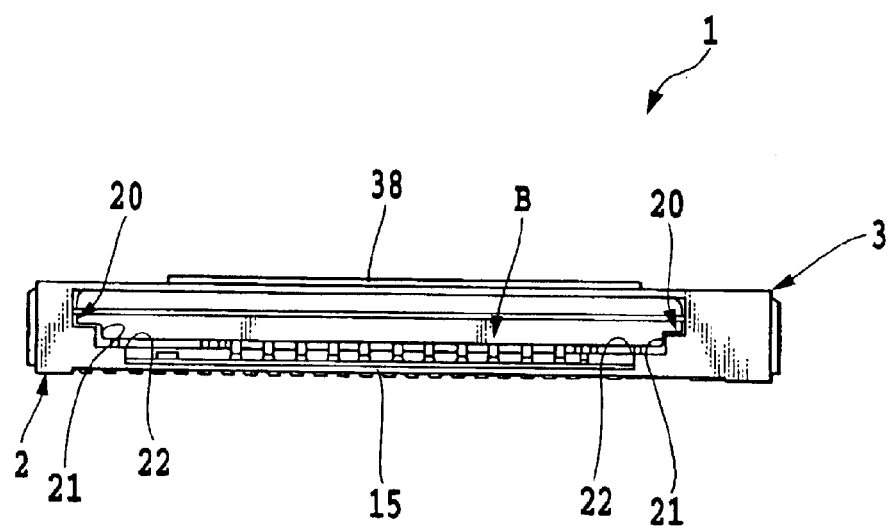
FIG. 22 is an end view of FIG. 20 as seen from the card-inserting opening.
Figure 23:
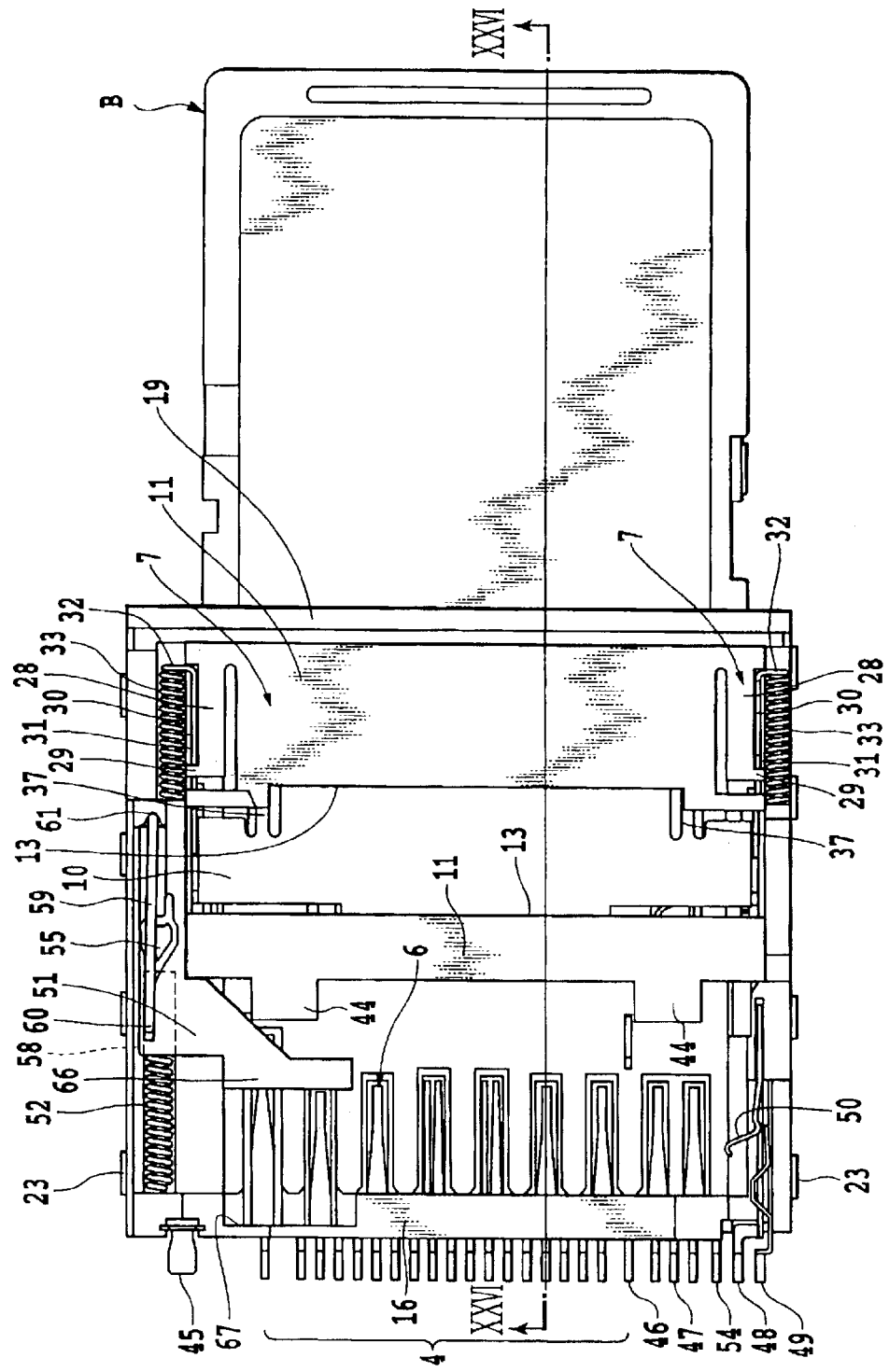
FIG. 23 is a plan view of the composite type card connector of the present invention shown in FIG. 20 when the insert of the large card begins, from which the cover member is removed.
Figure 24:
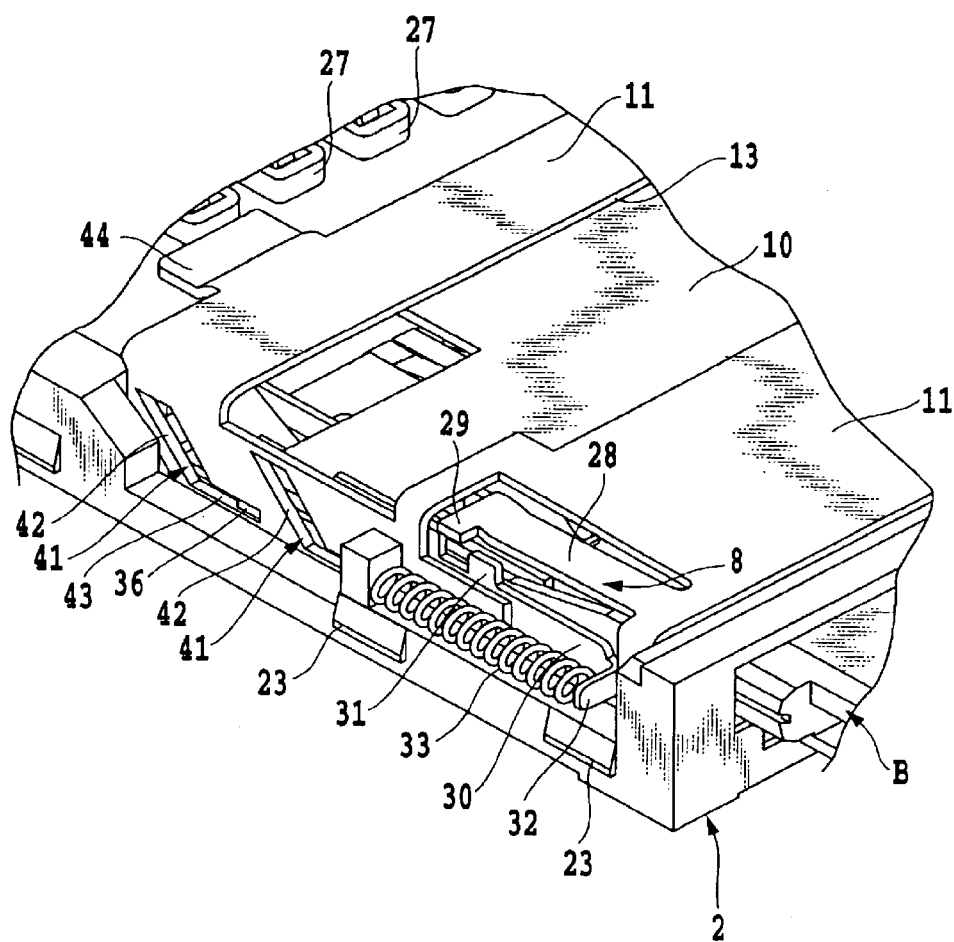
FIG. 24 is an enlarged view of the locking mechanism in the composite type card connector of the present invention shown in FIG. 23.
Figure 25:
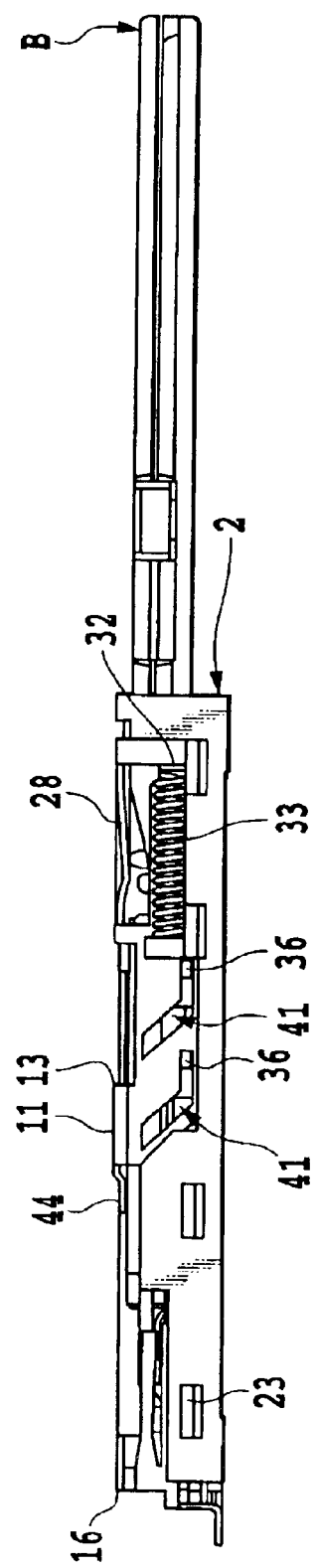
FIG. 25 is a side view of the composite type card connector of the present invention shown in FIG. 23 when the cover member is removed.
Figure 26:
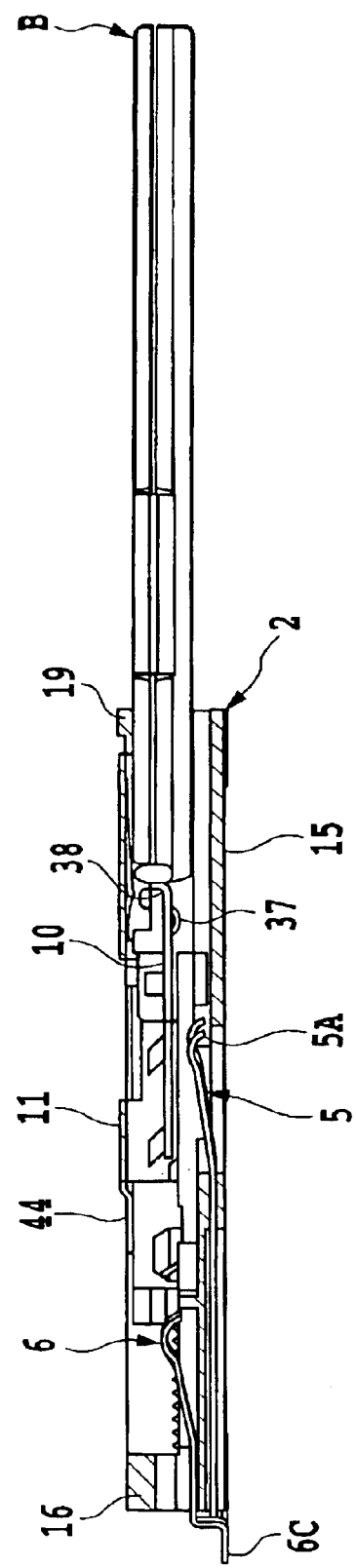
FIG. 26 is a sectional view taken along a line XXVI—XXVI in FIG. 23.
Figure 27:
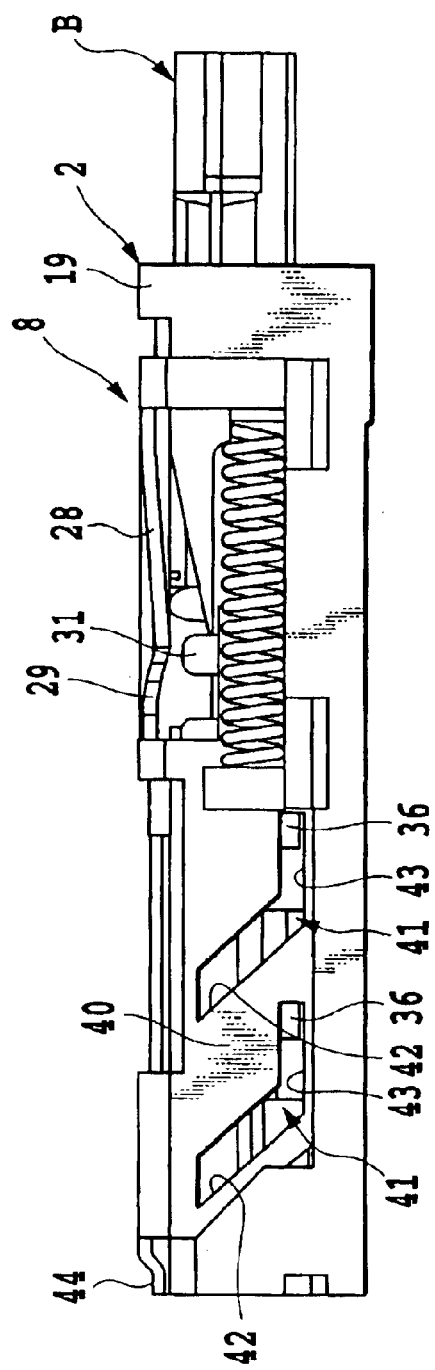
FIG. 27 is an enlarged view of the locking mechanism shown in FIG. 25.
Figure 28:
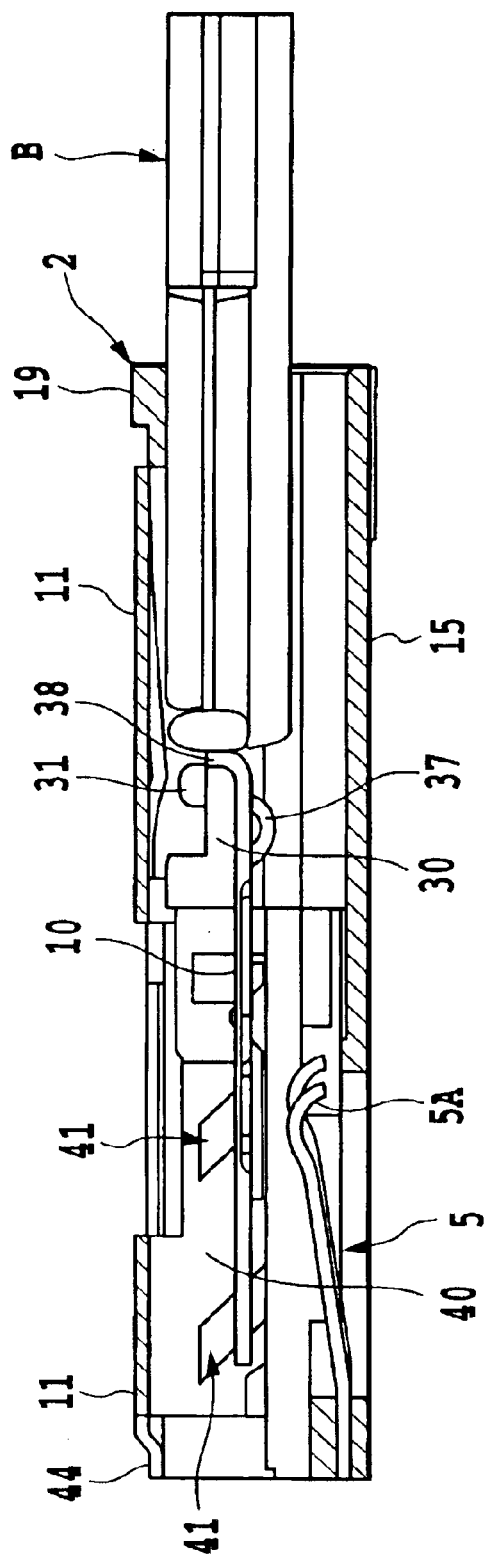
FIG. 28 is an enlarged sectional view thereof.
Figure 29:
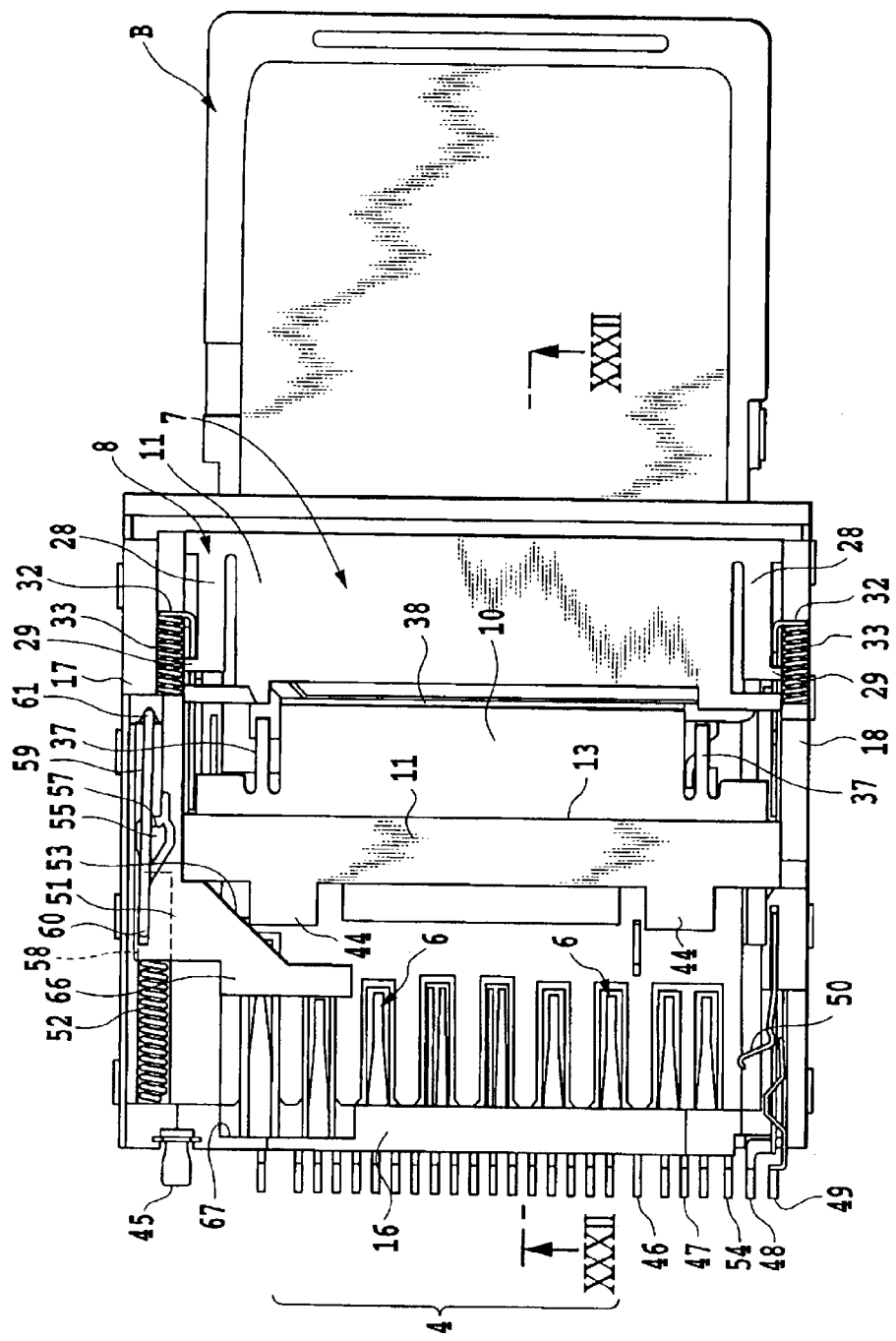
FIG. 29 is a plan view similar to FIG. 23 in which the large card is further inserted.
Figure 30:
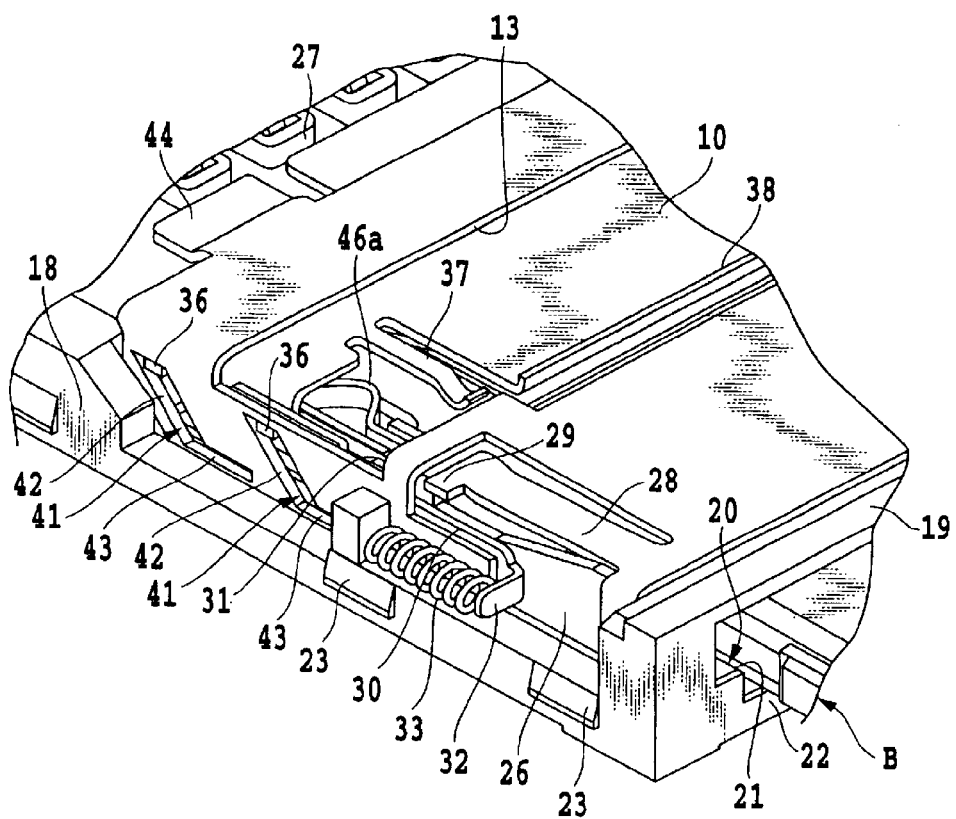
FIG. 30 is an enlarged perspective view illustrating the locking mechanism of the composite type card connector of the present invention shown in FIG. 29.
Figure 31:
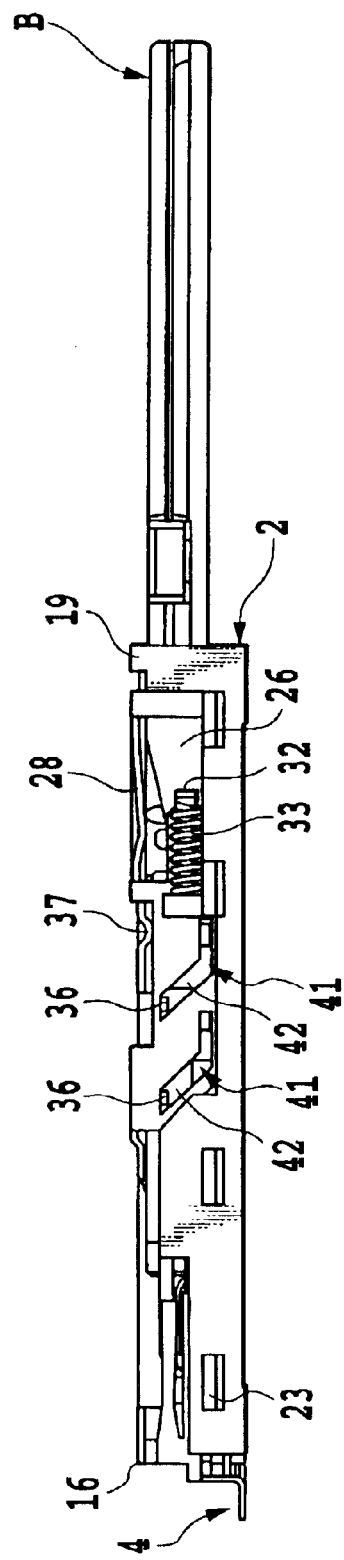
FIG. 31 is a side view of the composite type card connector of the present invention shown in FIG. 29.
Figure 32:
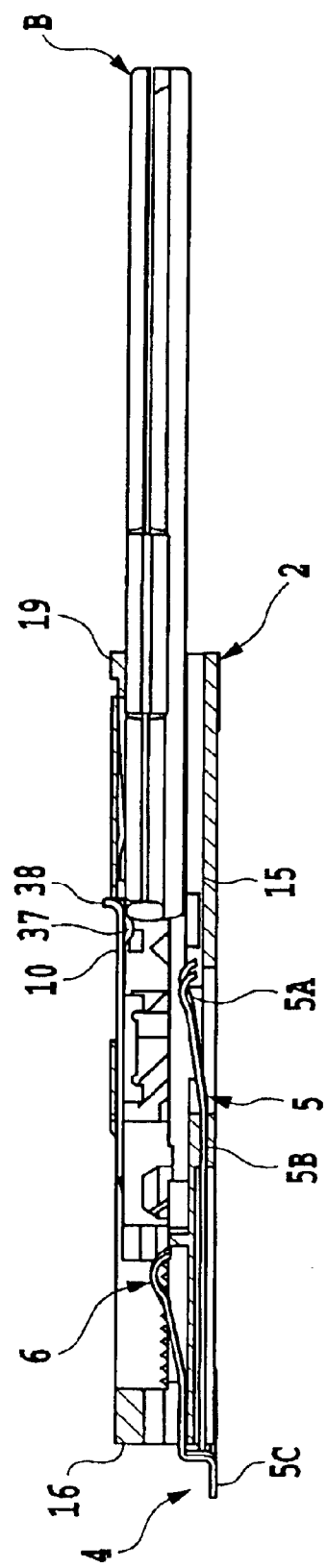
FIG. 32 is a sectional view taken along a line XXXII—XXXII in FIG. 29.
Figure 33:
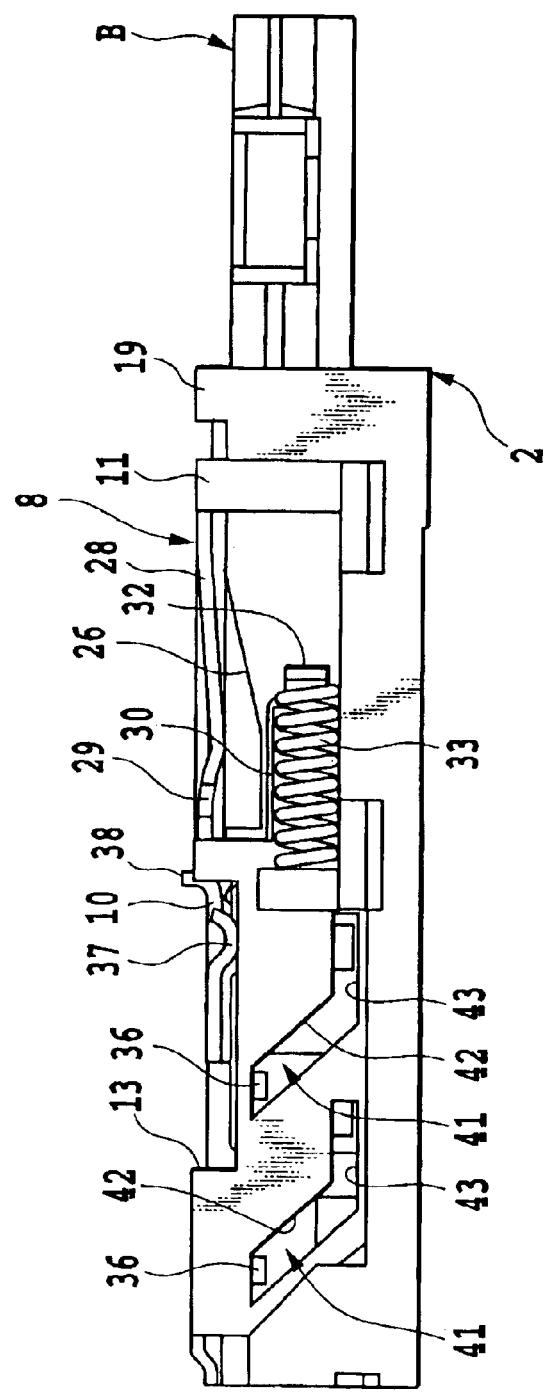
FIG. 33 is an enlarged view of the locking mechanism shown in FIG. 31.
Figure 34:
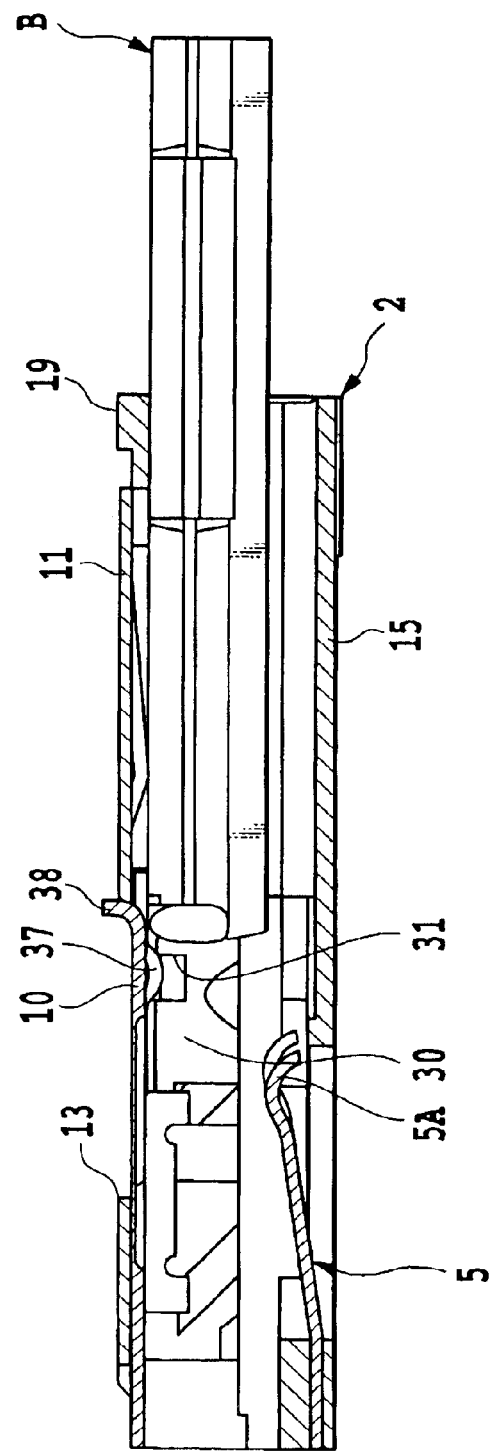
FIG. 34 is an enlarged sectional view of the locking mechanism shown in FIG. 32.
Figure 35:
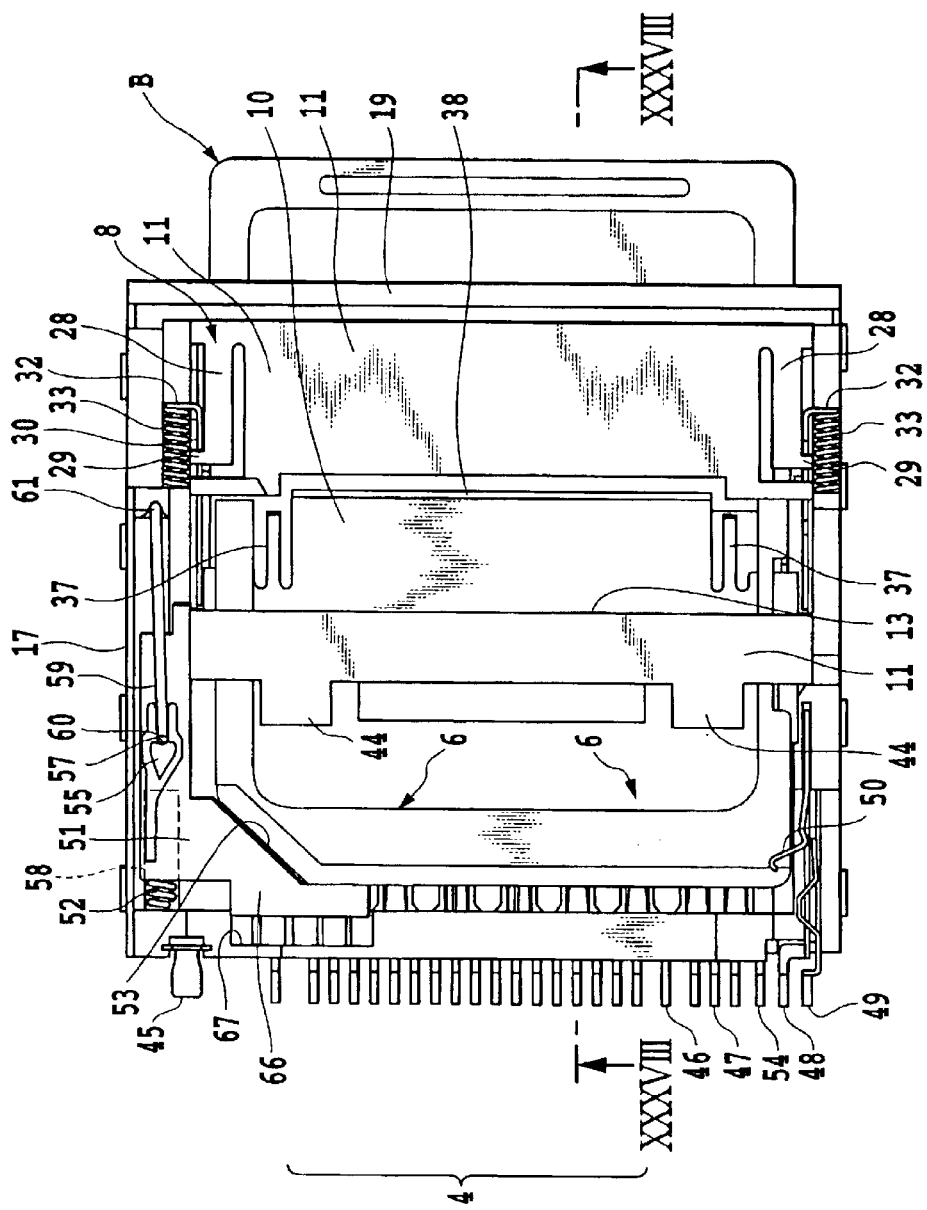
FIG. 35 is a plan view similar to FIG. 29 in which the large card has been completely inserted.
Figure 36:
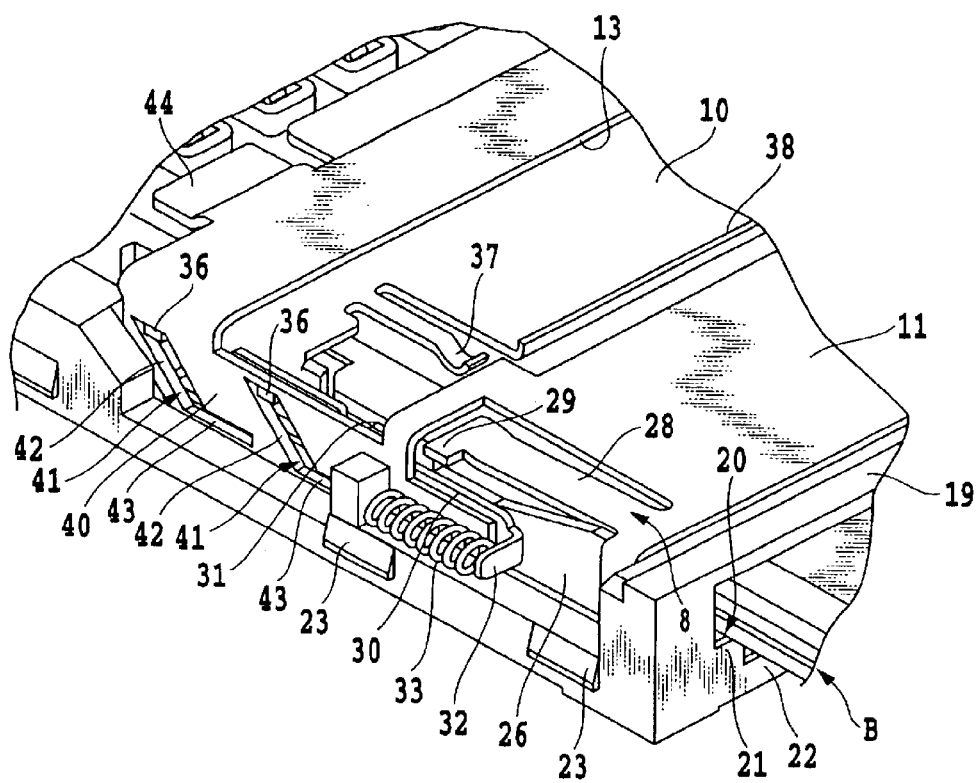
FIG. 36 is an enlarged perspective view of the locking mechanism in the composite type card connector of the present invention shown in FIG. 35.
Figure 37:
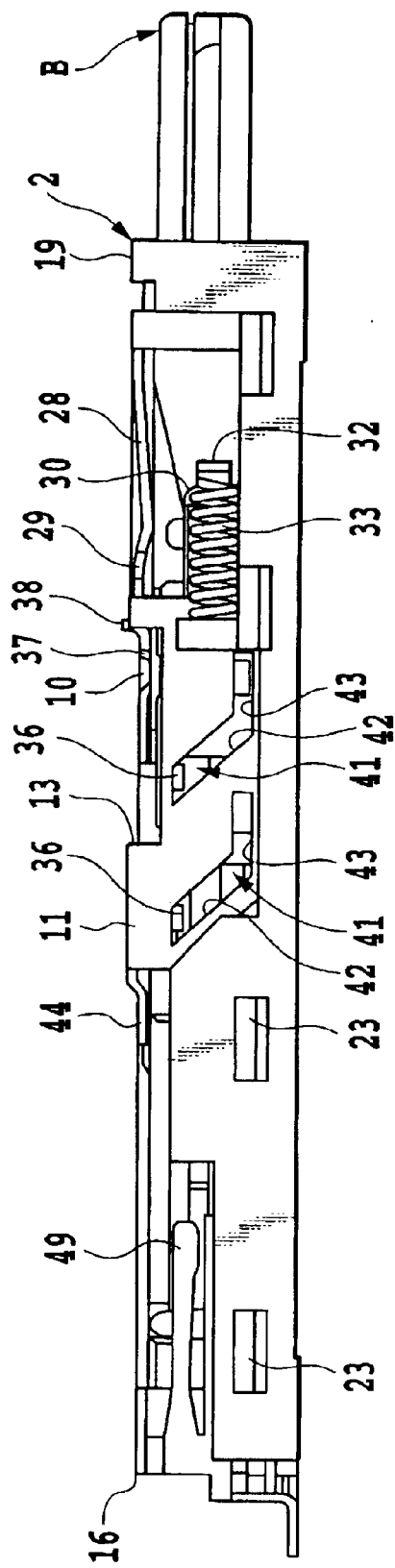
FIG. 37 is an enlarged side view of the composite type card connector of the present invention shown in FIG. 35.
Figure 38:
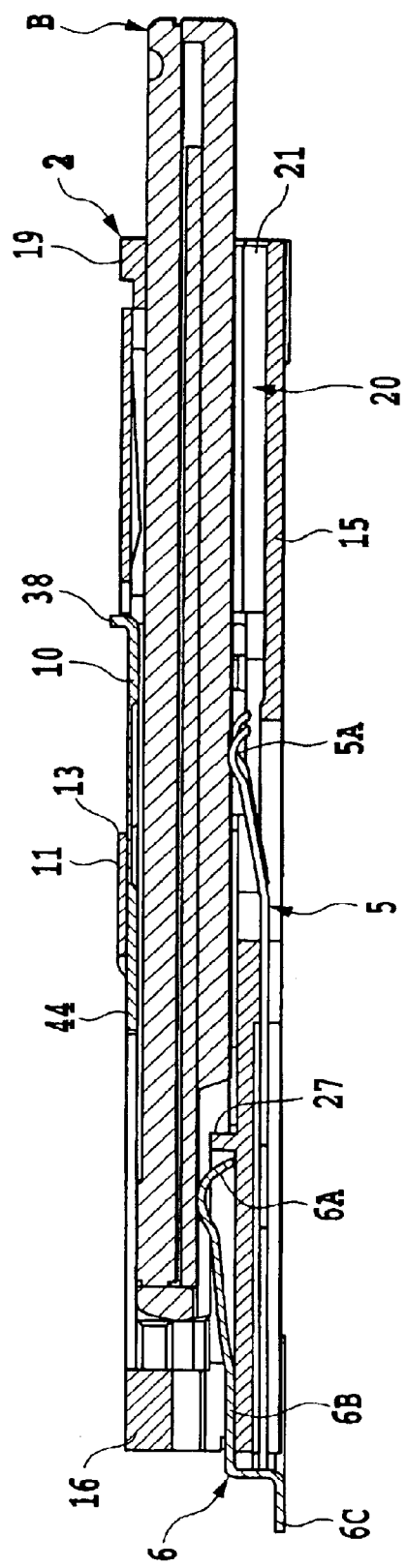
FIG. 38 is an enlarged sectional view taken along a line XXXVIII—XXXVIII in FIG. 35.
Figure 39:
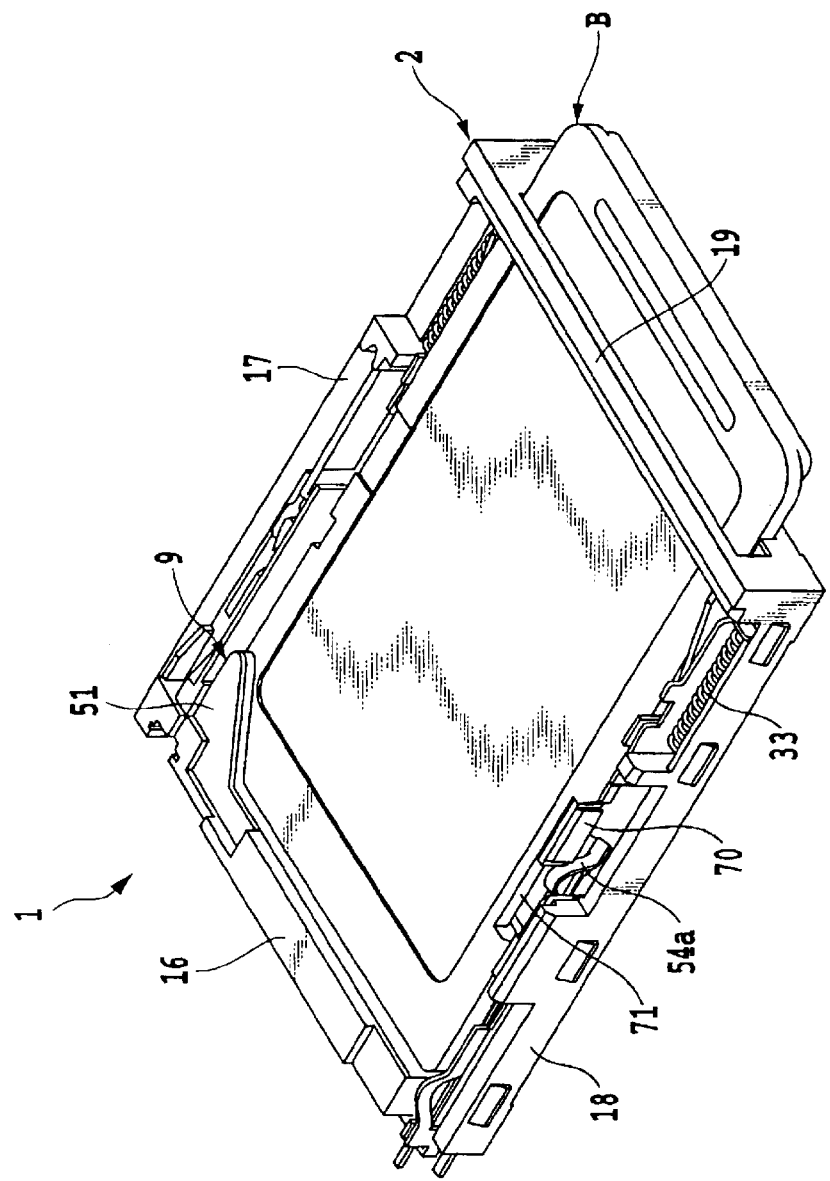
FIG. 39 is a perspective view of the composite type card connector of the present invention in which the large card has been completely inserted, while removing the cover member, the movable plate and the operating plate.
Figure 40:
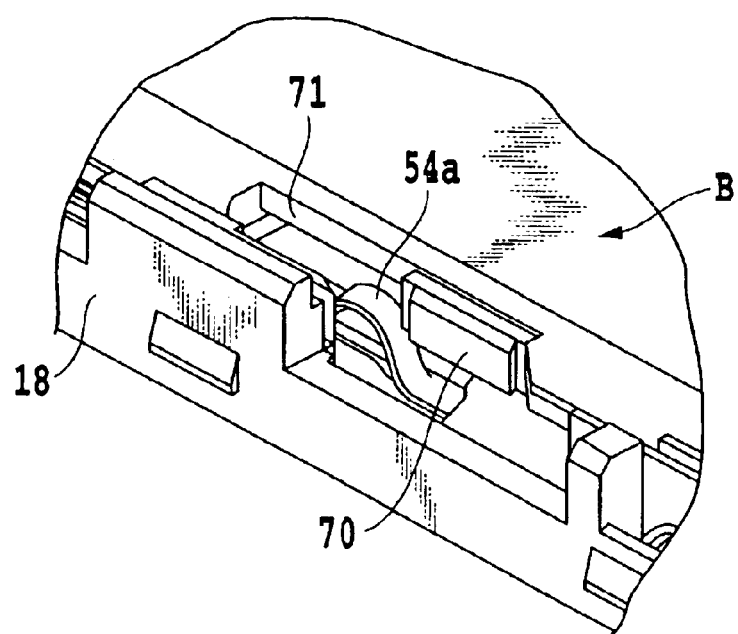
FIG. 40 is an enlarged perspective view of the composite type card connector of the present invention shown in FIG. 39, illustrating the write-protection contact and the recess in the large card.

FIGS. 20 to 40 illustrate the composite type card connector of the present invention when the large card is used, wherein FIG. 20 is an overall plan view of the composite type card connector of the present invention when the large card is inserted therein, from which the cover member is removed; FIG. 21 is a side view thereof; FIG. 22 is an end view thereof as seen from the card-inserting opening; FIG. 23 is a similar view as FIG. 20 which is an overall plan view of the composite type card connector of the present invention when the insert of the large card begins, from which the cover member is removed; FIG. 24 is an enlarged view of the locking mechanism in the composite type card connector of the present invention; FIG. 25 is a side view of the composite type card connector of the present invention shown in FIG. 23 when the cover member is removed; FIG. 26 is a sectional view taken along a line XXVI—XXVI in FIG. 23; FIG. 27 is an enlarged view of the locking mechanism shown in FIG. 25; FIG. 28 is an enlarged sectional view thereof; FIG. 29 is a plan view similar to FIG. 23 in which the large card is further inserted; FIG. 30 is an enlarged perspective view illustrating the locking mechanism of the composite type card connector of the present invention shown in FIG. 29; FIG. 31 is a side view of the composite type card connector of the present invention shown in FIG. 29; FIG. 32 is a sectional view taken along a line XXXII—XXXII in FIG. 29; FIG. 33 is an enlarged view of the locking mechanism shown in FIG. 31; FIG. 34 is a sectional enlarged view of the locking mechanism shown in FIG. 32; FIG. 35 is a plan view similar to FIG. 29 in which the large card has been completely inserted; FIG. 36 is an enlarged perspective view of the locking mechanism in the composite type card connector of the present invention shown in FIG. 35; FIG. 37 is an enlarged side view of the composite type card connector of the present invention shown in FIG. 35; FIG. 38 is an enlarged sectional view taken along a line XXXVIII—XXXVIII in FIG. 35; FIG. 39 is a perspective view of the composite type card connector of the present invention in which the large card has been completely inserted, while removing the cover member, the movable plate and the operating plate; and FIG. 40 is an enlarged perspective view of the composite type card connector of the present invention shown in FIG. 39, illustrating the write-protection contact and the recess in the large card.

When the large card B is used in the composite type card connector 1 of the present invention, as shown in FIGS. 21 to 40, the large card B is inserted from the card-inserting opening 14 into the composite type card connector 1 of the present invention.

As illustrated, the large card B is a card having larger dimensions in thickness, length and width as well as of a stair-shape, as illustrated. In this large card B, the width is as large as being matched with a width between the upper stepped sections 21 of the card mounting section 12 in the composite type card connector 1 of the present invention. Accordingly, when the large card B is inserted from the card-inserting opening 14 into the composite type card connector 1, a forward end of the large card B first abuts to the lower surfaces of the locking arms 28 in the operating plate 11 to push the locking arms 28 upward. Thereby, the locking claws 29 at a front end of the locking arms 28 are released from the projections 31 of the locking members 30 to unlock the locking mechanisms 8. Thus, the locking members 30 become free and slidable due to the elastic forces of the spring members 33. In such a manner, the locking claws 29 of the locking arms 28 are released from the projections 31 of the locking members 30 to unlock the locking mechanisms 8.

Subsequently, the forward end of the large card B is inserted into the card mounting section 12 within the composite card connector 1 while pushing the movable plate 10 upward so that the large card is located beneath the movable plate 10. Soon while, the chamfered corner of the forward end of the large card B is engaged and matched with the card-receiving section 53 of the ejection member 51. When the large card B is further pushed forward, the ejection member 51 is pushed and slides deeper inside. At this time, the ejection member 51 slides so that the end 60 of the cam lever 59 follows along the cam groove 56 of the ejection member 51.

When the end 60 of the cam lever 59 is located in the recess 57 of the cam groove 56, the end 60 of the cam lever 59 abuts to the recess 57 and is held at this position. Thus the ejection member 51 is fixed. This state is illustrated in FIGS. 35 to 40, in which the pad section on the lower surface of the large card B is firmly brought into contact and connected with the contact section 6A of the second contact member 6 (see FIG. 38).

At this time, the write-protection contact 54 corresponds to the set position of the write-protection contact key 70 of the large card B, whereby when the projection 54a of the write-protection contact 54 is pressed by the write-protection contact key 70, the write-protection contact 54 is also brought into contact with the combined-use card identification contact 47.

Accordingly, if the write-protection contact key 70 is set at a position shown in FIGS. 39 and 40, the projection 54a of the write-protection contact 54 is within the recess 71 of the large card B completely inserted into the composite card connector 1, whereby the write-protection contact 54 is never brought into contact with the card-identification contact 47.

On the contrary, when the write-protection contact key 70 is set at a position leftward from the recess 71 of the large card B as seen in the drawing, the write-protection contact key 70 abuts to the projection 54a of the write-protection contact 54 and presses the same, whereby the write-protection contact 54 is brought into contact with the combined-use card identification contact 47. In such a manner, the large card B is inserted and mounted so that the large card B is used to achieve the predetermined object.

To take out the large card B, after the latch engagement of the large card B with the ejection mechanism 9 is released by once slightly pushing the large card B as described before, the large card B is taken out. That is, when the large card B mounted in the composite type card connector 1 is once slightly pushed, the end 60 of the cam lever 59 positioned in the recess 57 of the heart cam 55 slightly moves in the lateral direction to be out of the recess 57. Thereby, the end 60 of the cam lever 59 becomes free to be movable along the cam groove 56. In this state, the ejection member 51 is slidable due to the action of the spring member 52.

Accordingly, since the ejection member 51 is pushed to move until reaching the midway of the composite type card connector 1, a half of the large card B emerges from the composite type card connector 1. Then, the end of the emerged large card B is gripped by fingers and pulled out from the composite type card connector 1. When the large card B has been completely discharged from the composite type card connector 1, the locking member 30 is pushed by the spring member 52 via the ejection member 51 and slides on the connector body 2 to stretch the spring member 33.

Simultaneously, the movable plate 10 is pushed downward by the movable plate presser 64 and moves obliquely forward and downward along the guide groove 41. Also, since the locking member 30 slides forward, the locking claw 29 of the locking arm 28 is engaged with the projection 31 of the locking member 30, which actuates the locking mechanism 8. Thereby, the movable plate 10 is locked at the lower original position, and thus the initial state is resumed.

As described, according to the composite type card connector 1 of the present invention, it is possible to use two kinds of cards having different sizes; the small card A and the large card B; without any troubles by a common card connector while necessitating no modification of the cards. Also, according to the present invention, it is possible to form the composite type card connector 1 as a case of a flat and thin housing shape, and preferably use it for an information terminal device or an electronic instrument such as a portable telephone, a game machine, a notebook type personal computer, a portable audio set, a television set, a video deck, a digital camera or a music microphone.

Further, according to the composite type card connector 1 of the present invention, movable parts are limited only to the movable plate 10 and the operating plate 11 in the switching operation mechanism 7, the locking member 30 in the locking mechanism 8, and the ejection member 51 in the ejection mechanism 9, which are simple in structure, capable of miniaturizing the size and facilitating the replacement.

As described above, according to the composite type card connector 1 of the present invention, it is possible to use two kinds of cards having different sizes; the small card A and the large card B; without any troubles by a common card connector while necessitating no modification of the cards. Also, according to the present invention, it is possible to form the composite type card connector 1 as a case of a flat and thin housing shape, and preferably use it for an information terminal device or an electronic instrument such as a portable telephone, a game machine, a notebook type personal computer, a portable audio set, a television set, a video deck, a digital camera or a music microphone.

(Second Embodiment)

Figure 41:
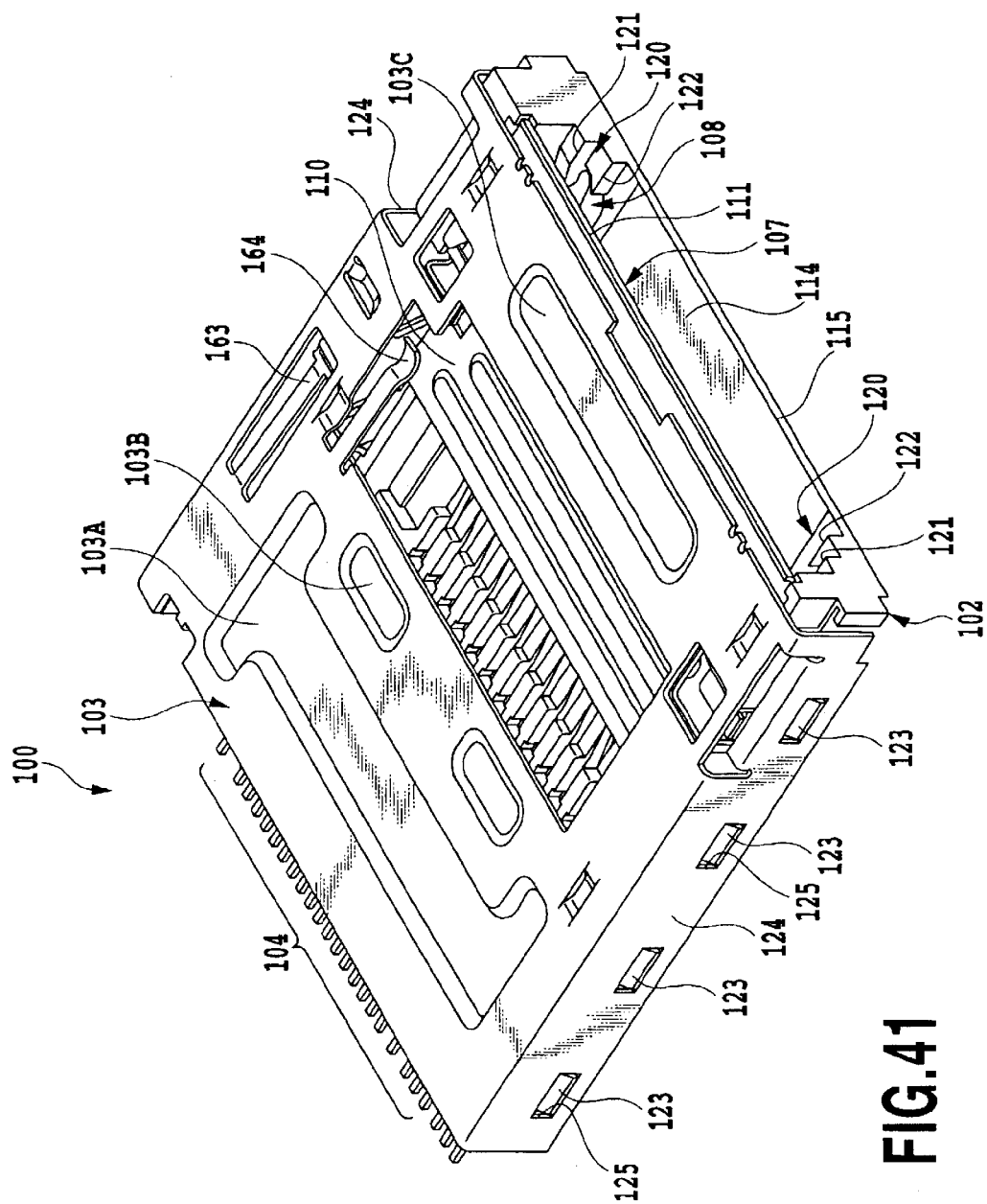
FIG. 41 is an overall perspective view of the composite type card connector of a second embodiment of the present invention as seen from the card-inserting opening side.
Figure 42:
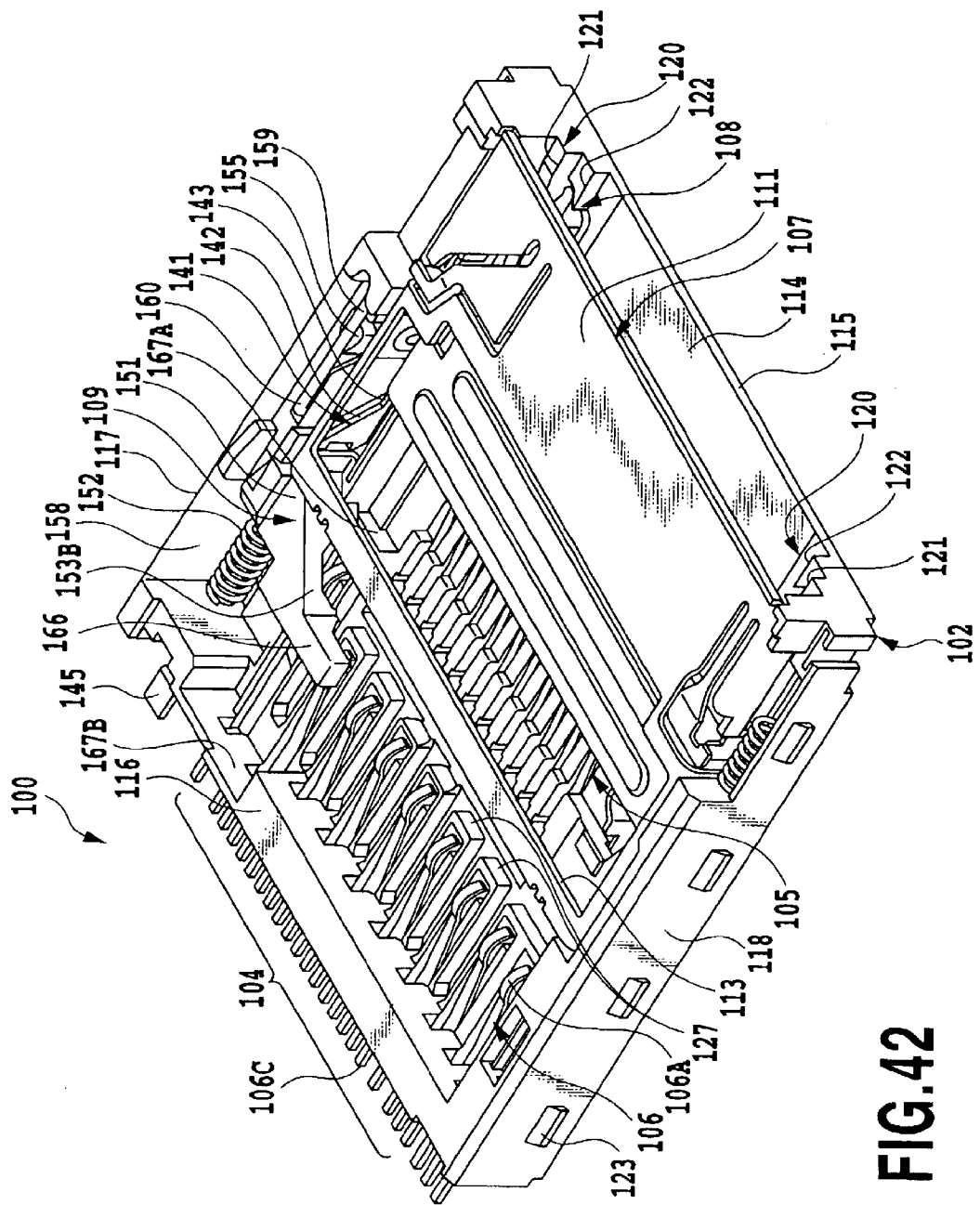
FIG. 42 is a perspective view of the composite type card connector shown in FIG. 41 while removing the cover member therefrom.
Figure 43:
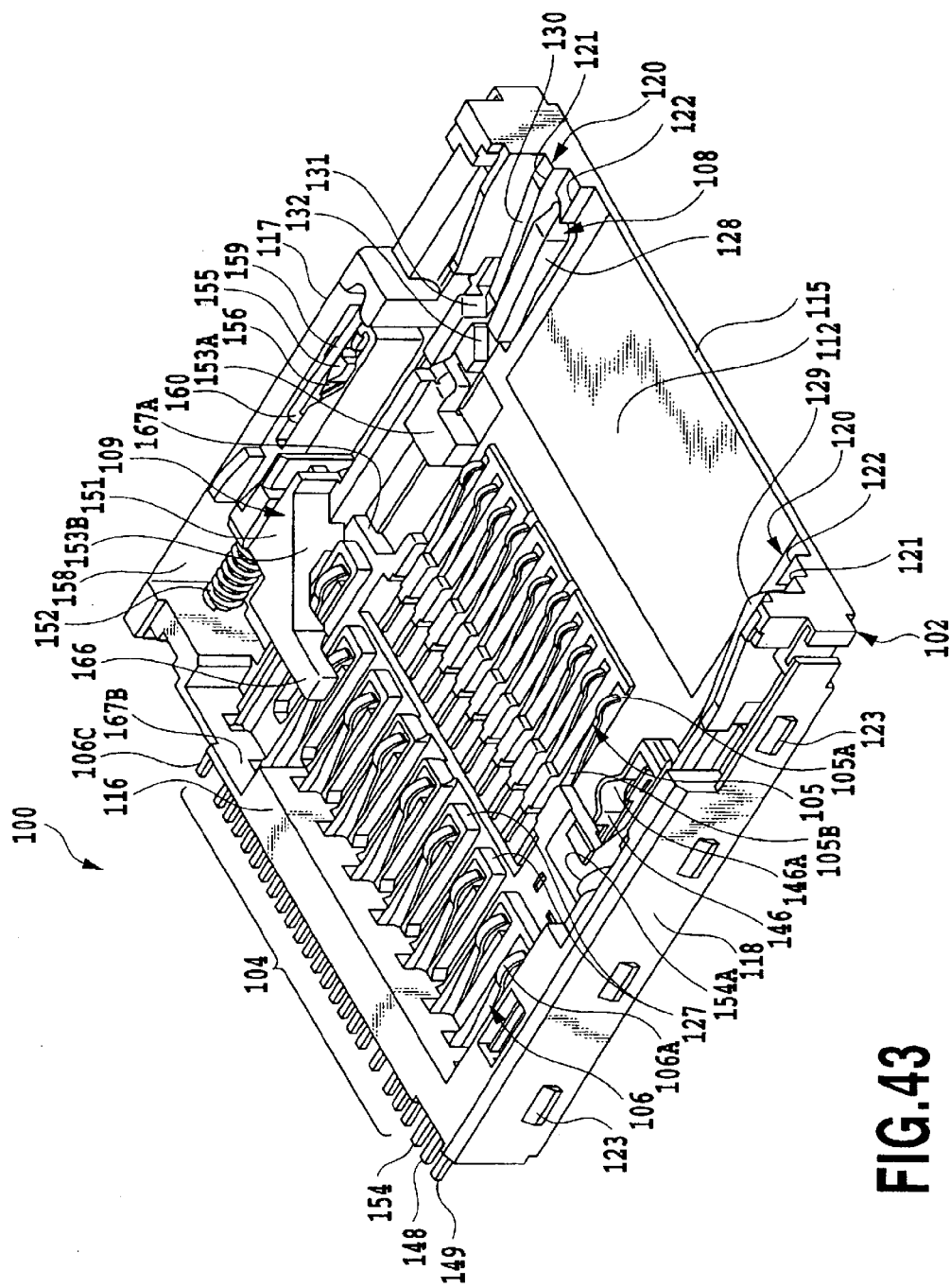
FIG. 43 is a perspective view of the composite type card connector shown in FIG. 41 while removing the cover member, the movable plate and the operating plate.
Figure 44:
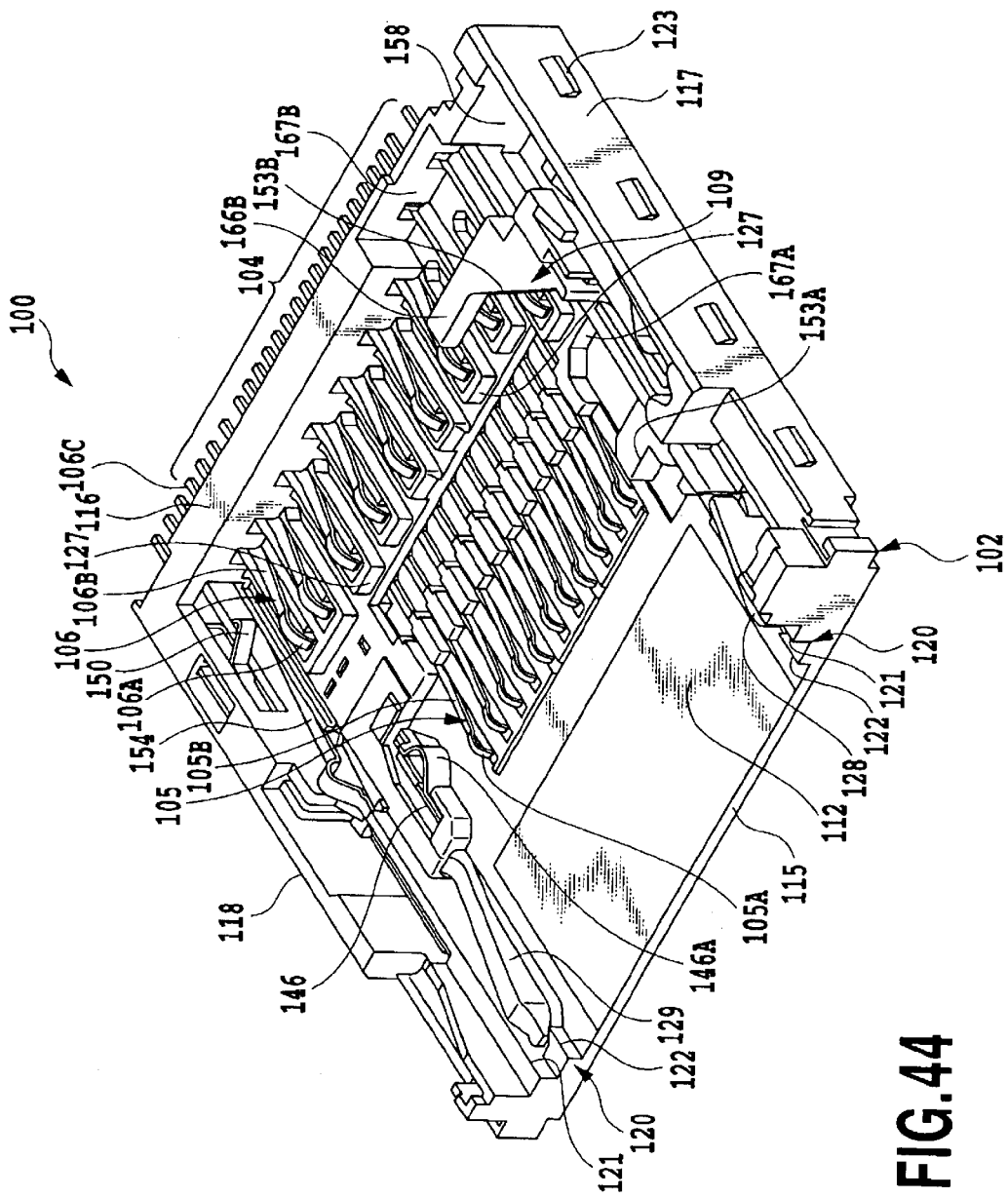
FIG. 44 is a similar perspective view as seen in the opposite direction to FIG. 43.
Figure 45:
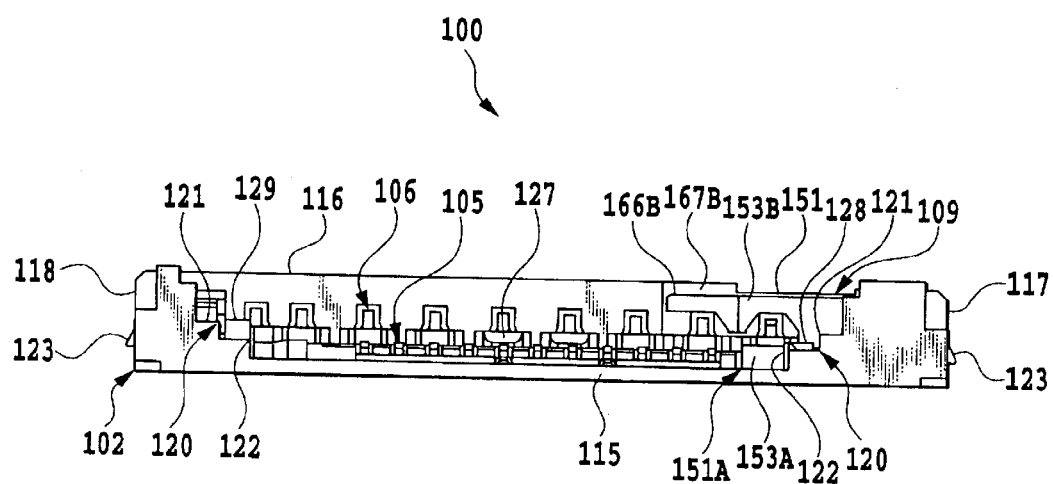
FIG. 45 is an end view of the second embodiment of the composite type card connector of the present invention shown in FIG. 41 as seen from the card-inserting opening side while removing the cover member, the movable plate and the operating plate.
Figure 46:
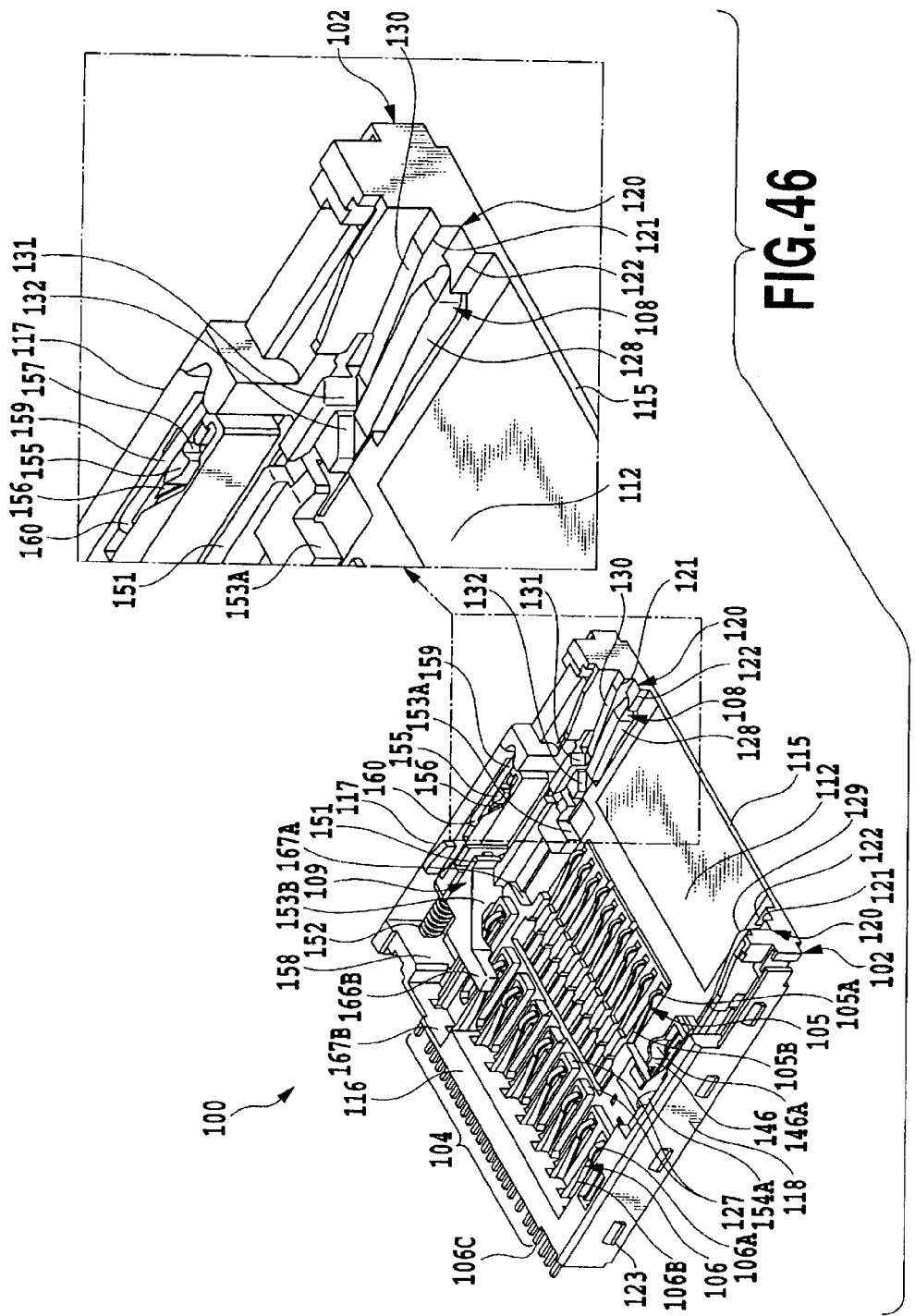
FIG. 46 is a perspective view of the composite type card connector of the present invention shown in FIG. 43 while enlarging a card guiding part of the card-inserting opening.
Figure 47:
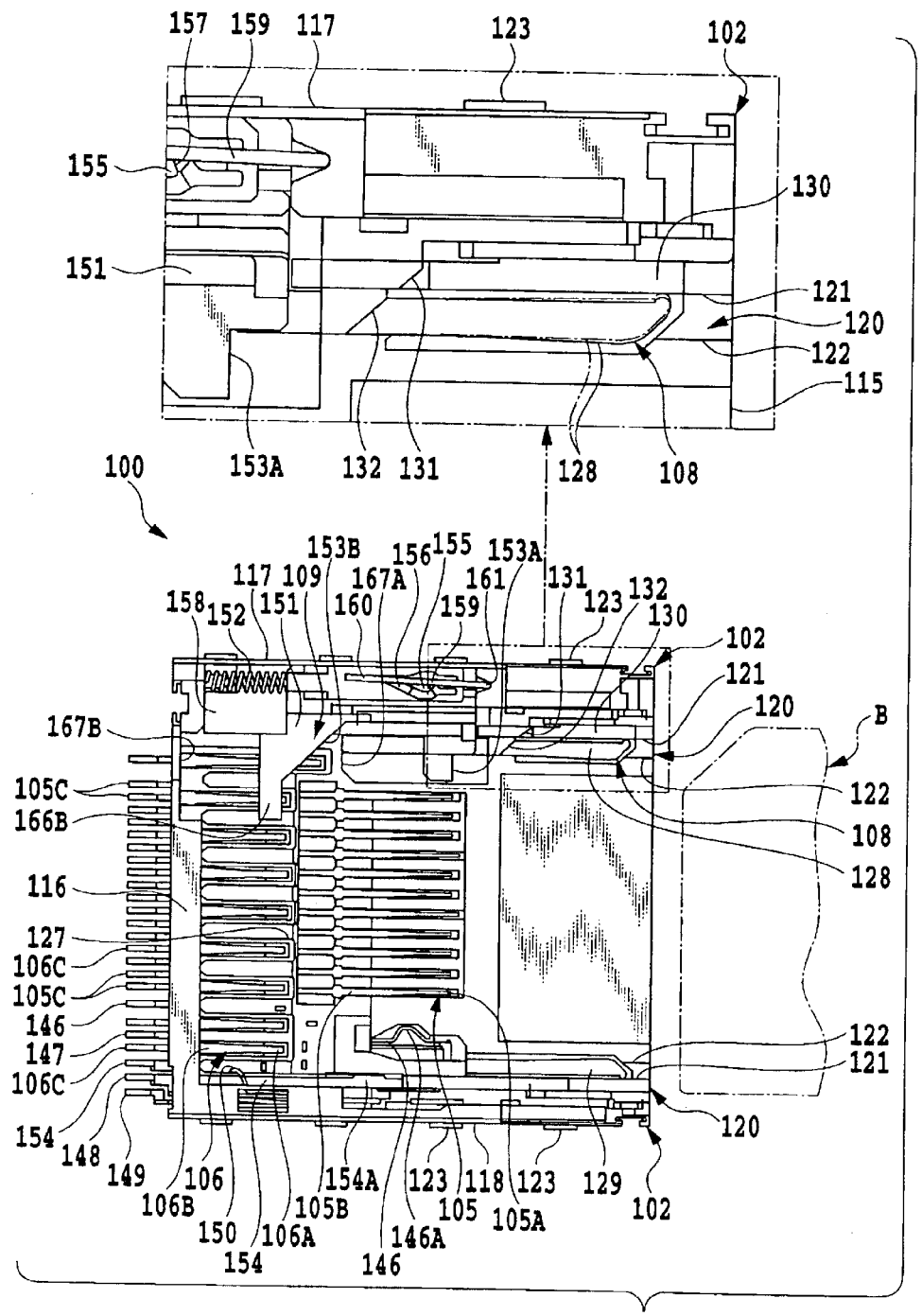
FIG. 47 is a plan view of the composite type card connector of the present invention shown in FIG. 46 while enlarging a card guiding part of the card-inserting opening.
Figure 48:
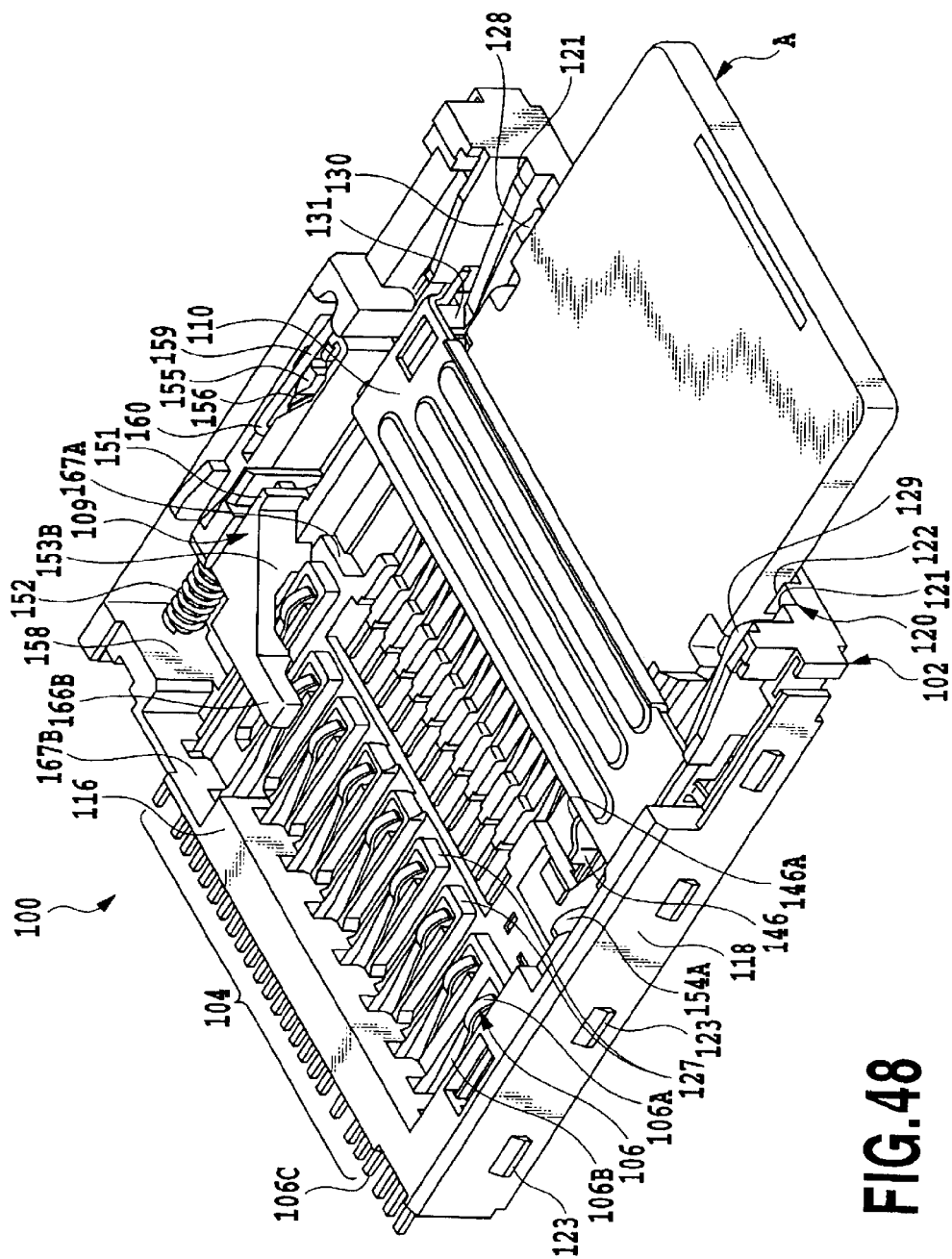
FIG. 48 is a perspective view of the second embodiment of the composite type card connector of the present invention shown in FIG. 41 when the small card is inserted, while removing the cover member and the operating plate.

FIGS. 41 to 54 illustrate a second embodiment of the composite type card connector of the present invention; wherein FIG. 41 is an overall perspective view of the composite type card connector of the present invention as seen from the card-inserting opening side; FIG. 42 is a perspective view of the composite type card connector shown in FIG. 41 while removing the cover member therefrom; FIG. 43 is a perspective view of the composite type card connector shown in FIG. 41 while removing the cover member, the movable plate and the operating plate; FIG. 44 is a similar perspective view as seen in the opposite direction to FIG. 43; FIG. 45 is an end view of the second embodiment of the composite type card connector of the present invention shown in FIG. 41 as seen from the card-inserting opening side while removing the cover member, the movable plate and the operating plate; FIG. 46 is a perspective view of the composite type card connector of the present invention shown in FIG. 43 while enlarging a card guiding part of the card-inserting opening; FIG. 47 is a plan view of the composite type card connector of the present invention shown in FIG. 46 while enlarging a card guiding part of the card-inserting opening; and FIG. 48 is a perspective view of the second embodiment of the composite type card connector of the present invention shown in FIG. 46 when the small card is inserted, while removing the cover member and the operating plate.

Figure 49:
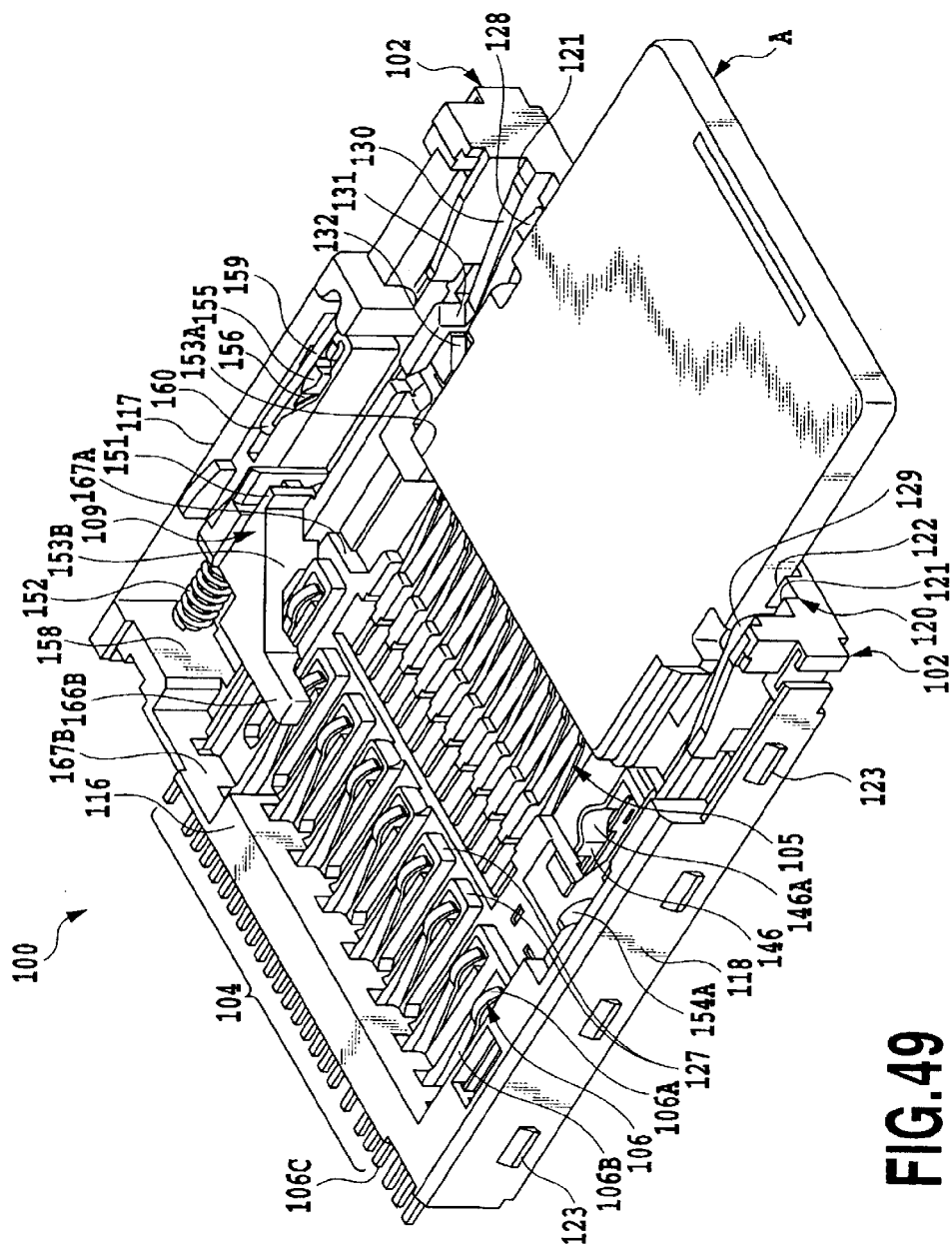
FIG. 49 is a perspective view of the second embodiment of the composite type card connector of the present invention shown in FIG. 41 at the regular position when the small card is inserted, while removing the cover member, the operating plate and the movable plate.
Figure 50:
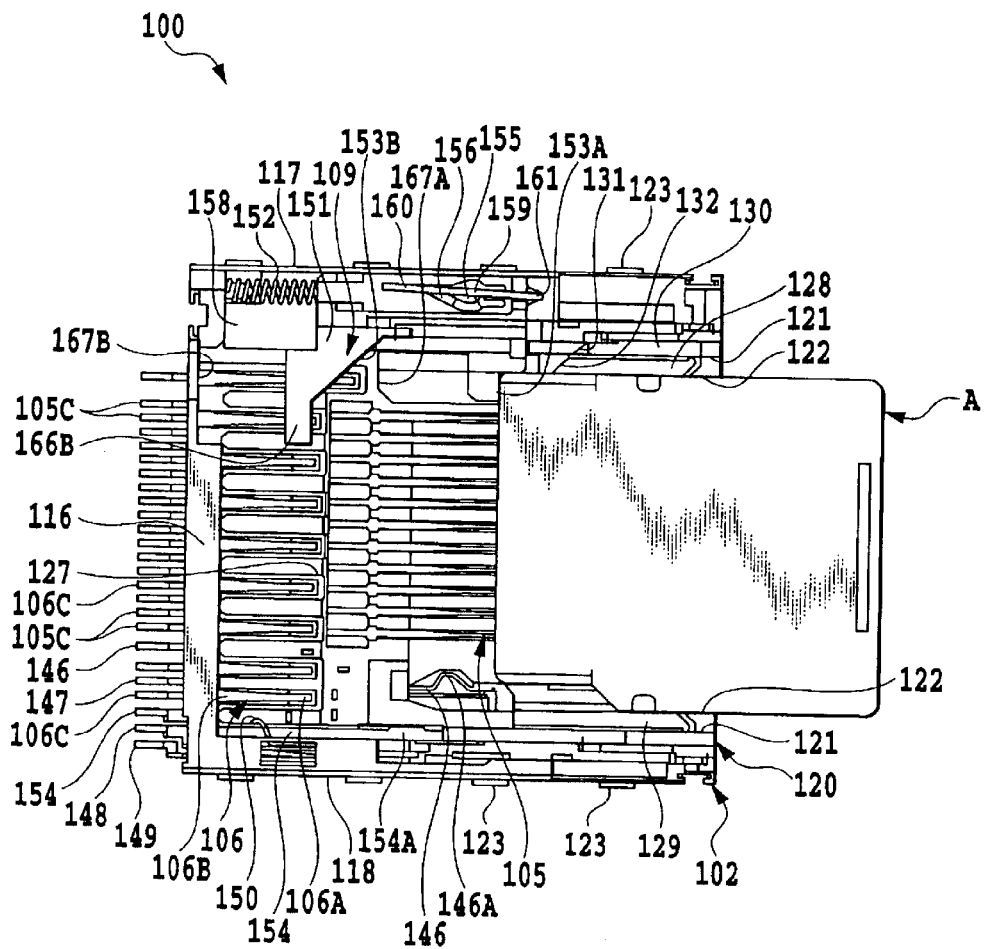
FIG. 50 is a plan view in correspondence to FIG. 49.
Figure 51:
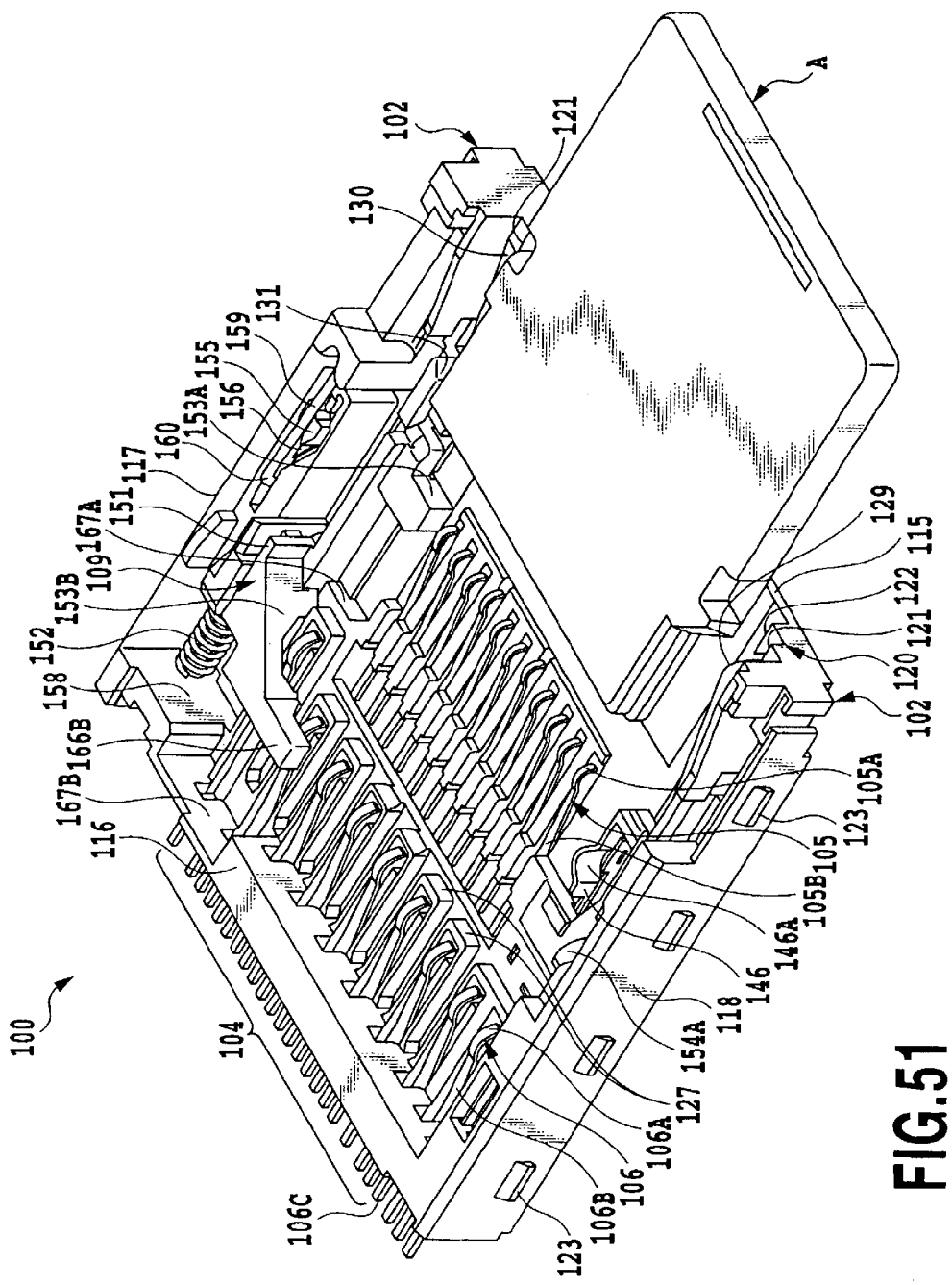
FIG. 51 is a perspective view of the second embodiment of the composite type card connector of the present invention shown in FIG. 41 at the middle step position of the guide when the small card is inserted, while removing the cover member, the operating plate and the movable plate.
Figure 52:
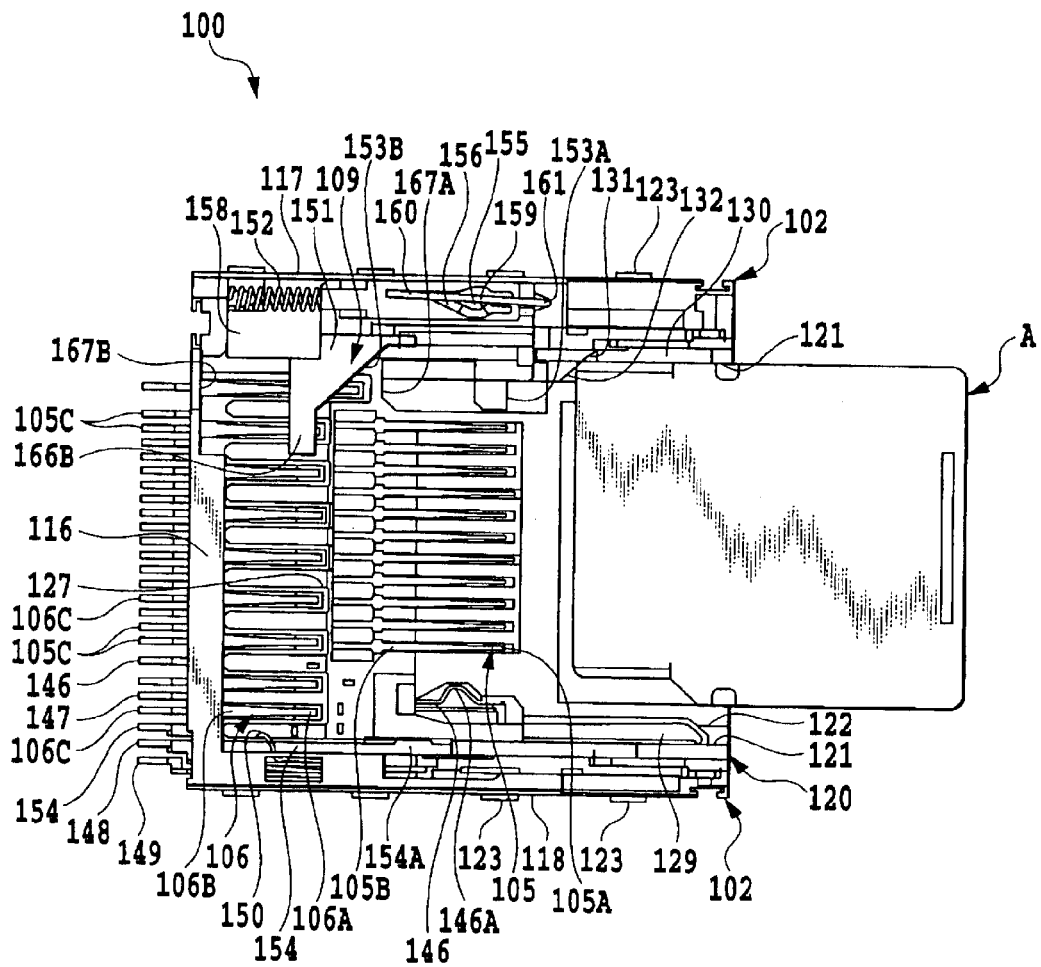
FIG. 52 is a plan view in correspondence to FIG. 51.
Figure 53:
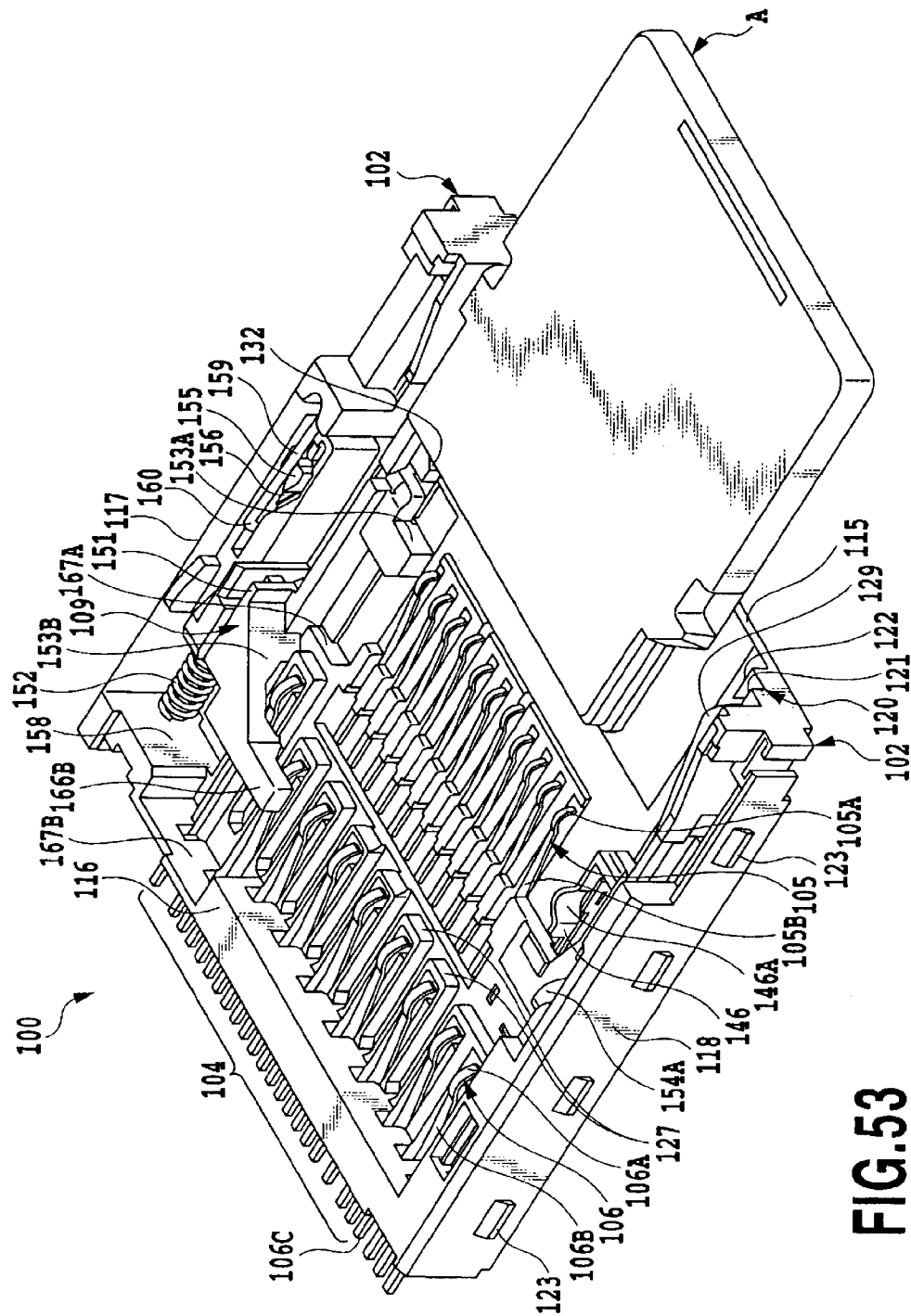
FIG. 53 is a perspective view of the second embodiment of the composite type card connector of the present invention shown in FIG. 41 at the upper step position of the guide when the small card is inserted, while removing the cover member, the operating plate and the movable plate.
Figure 54:
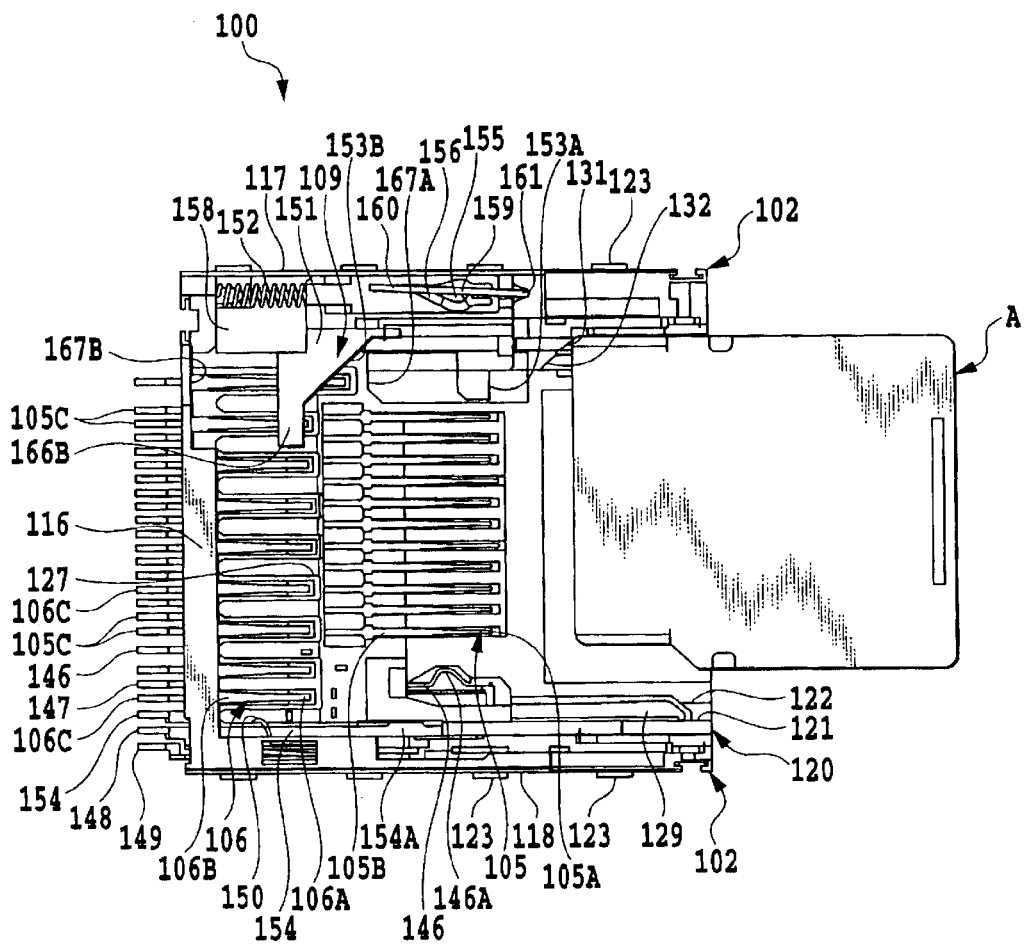
FIG. 54 is a plan view in correspondence to FIG. 53.

FIGS. 49 to 54 are perspective views and plan views of the composite type card connector of the present invention shown in FIG. 41 when the small card is normally inserted at a correct position and erroneously inserted at a middle step position or a upper step position of the card guide, respectively, while removing the cover member and the operating plate; wherein FIGS. 49 and 50 are a perspective view and a plan view, respectively, at the normal position; FIGS. 51 and 52 are a perspective view and a plan view, respectively, at the middle step position of the card guide; and FIGS. 53 and 54 are a perspective view and a plan view, respectively, at the middle step position of the card guide.

As shown in FIGS. 41 to 46, the composite type card connector 100 of the present invention in the second embodiment is commonly used for treating the small card A and the large card B as first and second cards, respectively, similar to the first embodiment described above. The sole difference from the first embodiment is in that the locking mechanism is eliminated but instead, a card holding mechanism 108 is provided, having elastic members 128 and 129 of a cantilever-like resinous spring. The remaining structure is substantially the same as the former. Therefore, the detailed description of the second embodiment will be eliminated or simplified regarding the same members as in the first embodiment.

As illustrated, the composite type card connector 100 of the second embodiment of the present invention includes a connector body 102, a cover member 103, a plurality of contacts 104 formed of first contact members 105 and second contact members 106, a switching operation mechanism 107, a card holding mechanism 108 and an ejection mechanism 109.

The composite type card connector 100 of the present invention is formed as a case of a flat housing-shape by the combination of the connector body 102 and the cover member 103, and has a card-mounting section 112 for inserting and mounting the card therein.

Similarly, the composite type card connector 100 of the present invention of the above-mentioned kind is used while being mounted, for example, to an information terminal device or others.

In the composite type card connector 100 of the present invention, one side of the card-mounting section 112 is opened to define a card-inserting opening 114. Further, on each of opposite sides of a front area of the card-mounting section 112 consecutive to the card-inserting opening 114, a stair-like stepped portion 120 is provided so that the front area of the card-mounting section 112 has a stepwise cross-section narrowing downward as going to a flat bottom thereof. The stepped portion 120 consists of an upper stepped section 121 and a lower stepped section 122 to form guide passages of a two-stairs shape for guiding the small card A and the large card B.

Accordingly, when the small card A is used, it is inserted into the lower stepped section 122 having the narrowest width and retained there. On the other hand, when the large card B is used, it is inserted into the upper stepped section 121 having the widest width and retained there. Opposite sides of the card-inserting opening 114 and the card-mounting section 112 consecutive thereto are of a stair-like shape so that the lower part is used for the small card A, and the upper part is used for the large card B.

The upper stepped section 121 having a larger width is used for the large card B, wherein the large card B is inserted into the upper stepped section 121 so that the step-shaped portion of the large card B is located at the upper stepped section 121 while being engaged therewith.

In the composite card connector 100 of the present invention, the other side of the card-mounting section 112 of the connector body 102 is closed by an end wall 116, along which are arranged a plurality of contacts 104 consisting of first contact members 105 and second contact members 106. The first contact member 105 and the second contact member 106 have terminals 105C and 106C, respectively, to be connected with terminals of an external information terminal device or a device. The first contact members 105 for the small card A are arranged so that contact sections 105A are provided approximately at an center of the connector body 102, while the second contact members 106 for the large card B are arranged along the end wall 116. The first contact members 105 and the second members 106 are arranged along the end wall 116 so that two of the first contact members 105 are approximately alternate with one of the second contact members 106.

The second contact members 106 in these contacts 104 are provided in a rear area of the connector body 102 to be located on independent supports 127 along the end wall 116, so that the contact section 106A of the second contact member 106 is favorably brought into contact with a contact pad of the large card B in addition to the independence of the contact pad of the large card B as well as the large card B is prevented from being inversely inserted.

Besides these contacts 104, as illustrated, a card-identification contact 147 for the small card, a card-identification contact 148 for the large card and a write-protection contact 154 for protecting data from being erroneously erased are provided similar to the first embodiment. The write-protection contact 154 has, in a front portion of the interior thereof, a projection 154a to be engaged with a write-protection contact key or recess of the large card B. Thereby, when the large card B is inserted and the projection 154a of the write-protection contact 154 is pushed in correspondence to a set position of the write-protection contact key of the large card B, the projection 54a is brought into contact with the card-identification contact 147 which is a common contact.

As illustrated, one of the card-identification contact 147 for the small card is formed to be also used as the card-identification contact for the large card or the write-protection contact 154. In the illustrated embodiment of the present invention, the card-identification contact 147 is selected for this purpose.

A cantilever-like spring member 150 is provided in parallel to the card-identification contacts 147, 48 and the write-protection contact 154 and operates as a braking member for preventing the large card B from coming off when it is inserted. Further, in addition to these card-identification contacts 147, 148, a switch contact 149 is provided to be operative by the spring member 150 when the large card B is inserted. Moreover, a tab 145 is provided for soldering and grounding various kinds of these contacts to a substrate. Preferably, a spring contact 146 having a projection 146a is provided as a movable piece for the card identification.

In the composite type card connector 100 of the present invention, the connector body 102 has latch projections 123 to be engageable with windows 125 of opposite side bending walls 124 of the cover member 103.

In the composite type connector 100 of the present invention described above, the connector body 102 is molded with insulation material such as suitable synthetic resinous material and combined with the cover member 103 made of metallic sheet material to form a flat case.

In the composite type card connector 100 of the present invention, the small card A or the large card. B is inserted from the card-inserting opening 114 of the composite type card connector 100 and mounted to the interior of the card mounting section 112. The first contact members 105 and the second contact members 106 are arranged at required positions with necessary heights to be connected to pads arranged at a forward end of a lower surface of the small card A or the large card B.

In the first contact member 105 and the second contact member 106, the semicircular contact sections 105A and 106A bending upward are formed at inner free ends thereof. These contact sections 105A and 106A are formed to be elastically brought into contact with the pads of the small card A or the large card B inserted from the card-inserting opening 114 at required positions. In this regard, the second contact members 106 are arranged so that the contact section 106A is located on the support 127 provided rearward of a base 115 of the socket body 102 and also, as illustrated, bends at the terminal 106C on the out end side approximately at a right angle and fixed to the end wall 116 of the socket body 102 by a one-piece molding or a press-fitting. The second contact member 106 has the terminal 106C to be connected to an external device in a similar manner as the first contact member 105. The first contact member 105 is fixed to the base 115 of the connector body 102 in a middle portion 105B closer to the rear area thereof. The first contact member 105 and the second contact member 106 described above are fixed to the base 115 of the socket body 102 in the middle portions 105B and 106B thereof.

In this regard, in this embodiment, the cards A and B used for the composite type card connector 100 of the present invention are, for example, a mini SD card and a SD card, suitably "Memory Stick Duo" (registered trade mark) as the small card A and "Memory Stick" (registered trade mark) as the large card B in a similar manner as in the first embodiment. However, the present invention should not be limited to these cards but other memory cards such as SD card, IC card or SIM card may be, of course, used.

As illustrated, in the composite type card connector 100 of the present invention, a movable plate 110 of the switching operation mechanism 107 is provided approximately at a center of the card mounting section 112 and an operating plate 111 is provided at a position on the card-inserting opening 114 side thereof. The operating plate 111 has an opening 113 approximately at a center thereof and card pressers 128 for holding the large card B which is the second card on opposite sides of a front portion thereof.

In the card-inserting opening 114 of the connector body 102, a card holding mechanism 108 having elastic members 128 and 129 is provided. These elastic members 128 and 129 are adapted to elastically hold the inserted small card A by pressing opposite side portions of the small card A inward.

As illustrated, the elastic member 128 or 129 is of an elongate cantilever-shape and fixed at a rear end inner than the card-inserting opening 114 to the base 115 of the connector body 102, while the other end thereof is elastically deformable inward and downward. These elastic members 128 and 129 have different heights from each other relative to the base 115, so that the right elastic member 128 is lower than the left elastic member 129. Thereby they are suitably engageable with the small card A in correspondence with the shape thereof to properly guide the small card A to a required position. These elastic members 128 and 129 may be formed to have the same height. While the elastic member 128, 129 of the card holding mechanism 108 are made of synthetic resin to be integral with the connector body 102 in the second embodiment, they may be made of metallic material and then molded or press-fit into the connector body 102. An inner side surface of each of these elastic members 128 and 129 is bulged further inward than the side surface of the lower stepped section 122 of the stepped portion 120 to be engage with the side edge of the inserted small card A.

The movable plate 110 of the switching operation mechanism 105 has a bending portion on each of opposite sides thereof formed by bending an elongate plate member downward. A plurality of projections or a card presser are projected outward from the bending portion in the similar manner as in the first embodiment. An front edge of the movable plate 110 is slightly curved upward to form a curved portion which protects a forward end of the small card A or the large card B and enhances the guiding of the small card A or the large card B to the underside of the movable plate 110.

In the movable plate 110, two projections provided on each of the opposite sides are engaged in guide grooves 141 extending in the oblique direction formed in a bending portion 140 of the operating plate 111. Accordingly, when the large card B is inserted, the forward end of the large card B is first brought into contact with the curved portion of the movable plate 110 to push the movable plate 110 deeper inward. Thereby, the projection on each of the left and right sides of the movable plate 110 moves along the horizontal section 143 of the guide groove 141 in the horizontal direction, and then moves to be pushed obliquely upward along the sloped section 142 of the guide groove 141. Thus, the movable plate 110 is pushed upward and soon the large card B is pushed into beneath the movable plate 110. In such a manner, the operating plate 111 is pushed upward by the large card B.

Card pressers 144A and 144B are provided in the operating plate 111 and properly presses the inserted large card B to prevent the mounted large card B from coming off.

As illustrated, the composite type card connector 100 of the present invention is provided with cantilever spring-like elastic members 128 and 129 of the card holding mechanism 108 on opposite sides of the operating plate 111 inside the card-inserting opening 114, so that edge portions of the opposite surfaces of the inserted small card A are gripped by the inner side surfaces of the elastic members 12B, 129 to suitably hold the small card A in the elastic manner.

One of side walls 117 of the connector body 102 has a guide slope 130 contiguous to the upper stepped section 121, and at a tail end of the guide slope 130, there is a vertical slope 131 inclined inward. Another vertical slope 132 is provided in the lower stepped section 122 contiguous to the inside of the former. The guide slope 130 and the slopes 131, 132 operate to suitably guide the small card A to a required position when the small card A is inserted while deflecting from the upper stepped section 121.

Accordingly, when the small card A is inserted, a forward end of the small card A first pushes a front ends of the elastic member 128 outward so that the small card A is located at a required position between the lower stepped sections 122 and firmly and elastically held there.

Thereby, since the small card A is suitably introduced beneath the movable plate 110 and further inserted inward, the small card A is engaged at the forward end thereof with a first card receiving section 153A of the ejection member 151 and pushes the ejection member 151 until the front end of the first card receiving section 153 in the ejection member 151 enters a first cut section 167A and is brought into contact therewith. When the small card A has reached a final position, the hand is released and the ejection member 151 is slightly pushed back by the action of the spring member 152. Thereby, since a front end 160 of a cam lever 159 is located in a recess 157 of a cam groove 156 on the circumference of a heart cam 155, the small card A is held at this position in a stable state to suitably bring the pad section of the small card A into contact with the elastic contact section 105A of the first contact member 105.

In the composite type card connector 100 of the present invention, the ejection mechanism 109 is provided along the side wall 117 of the connector body 102. As illustrated, the ejection mechanism 109 is adapted to insert the small card A and the large card B to be brought into contact with the first contact member 105 and the second contact member 106, and discharge these small card A and the large card B.

The ejection mechanism 109 for discharging the small card A and the large card B includes the ejection member 151 provided as a slider along one of side walls 117 of the connector body 102, a spring member 152 of a coil spring elastically deformable by the pressure of the ejection member 151, a heart cam 155 formed on the upper surface of the ejection member 151, and a cam lever 159, one end 160 of which is engageable with a cam groove 156 formed on the circumference of the heart cam 155. In this regard, the heart cam 155 and/or the cam groove 156 may be provided not only on the upper surface but also on the side surface of the ejection member 151.

On the inside of the ejection member 151, there are a first card receiving section 153A and a second card receiving section 153B engageable with corners of the small card A and the large card B, respectively. On the side surface of the ejection member 151 closer to the side wall 117, there is a recessed spring accommodating section 158 for receiving one end of the spring member 152 and accommodating the same. In such a manner, the first and second card receiving sections 153A and 153B are provided for suitably receiving both the cards A and B.

The second card receiving section 153B is formed to be suitably engageable with the large card B, a corner of which is chamferred for preventing the large card B from being inserted upside down. Accordingly, when the large card B is inserted is inserted upside down, a non-cut corner of the large card B is brought into contact with the second card receiving section 153B, causing the mismatch of both the members, whereby the large card B is prevented from being inserted upside down.

The other end 161 of the cam lever 159 is supported for rotation by a projected portion of the side wall 117 in the connector body 102. Thus, when the small card A or the large card B is inserted and the ejection member 151 is made to slide, the ejection member 151 moves so that one end 160 of the cam lever 159 follows the cam groove 156. Thereby, if the hand is released when the small card A has been inserted and the first card receiving section 153A of the ejection member 151 has been brought into contact with a wall of the first cut section 167A of the base 115, the small card A is slightly pushed backward to locate the end 160 of the cam lever 159 in the recess 156 in the heart cam 155, and fixed there.

Since the ejection member 151 is pushed by the spring member 152 at the position of the recess 156, it is held approximately in a fixed state at a position at which the end 160 of the cam lever 159 abuts to the recess 157. Accordingly, the inserted small card A is fixed at the inserted position so that the pad section of the small card A is favorably brought into contact with the contact section 105A of the first contact member 105.

A cam lever presser 163 of a cantilever-like blade spring is formed in the cover member 103 so that the cam lever 159 is elastically pushed to hold the end 160 of the cam lever 159 not to be released from the cam groove 156. Similarly, in the cover member 103, a movable plate presser 164 of a cantilever-like spring is provided for pressing and retaining the movable plate 110. Also, in the cover member 103, concave ribs 103A, 103B and 103C are provided, wherein the rib 103A serves as the reinforcement and the card presser, while the ribs 103B and 103C serve as the reinforcement.

When the small card A mounted to the composite type card connector 100 of the present invention is discharged after the predetermined object has been performed, the small card A mounted to the composite type card connector 100 is once slightly pushed to release the latch engagement of the small card A. That is, if the small card A mounted to the composite type card connector 100 is once slightly pushed, the end 160 of the cam lever 159 located in the recess 157 of the heart cam 157 is made to move in the lateral direction and released therefrom.

Since the end 160 of the cam lever 159 becomes free thereby and is able to follow the cam groove 156, the ejection member 151 is slidable by the action of the spring member 154 in this state. Thus, the ejection member 151 is pushed by the spring member 154 to a midway of the composite type card connector 100 and a portion of the small card A is exposed.

Subsequent thereto, the exposed end of the small card A is gripped by fingers and pulled outward, whereby the small card A is smoothly and completely discharged from the composite type card connector 100. When the small card A has been completely discharged from the composite type card connector 100, the operating plate 111 is pushed downward to the initial position, and the movable plate 110 is made to move downward along the guide groove 141. Accordingly, the movable plate 110 is fixed at the lower position and returns to the original state. This is substantially true also to the large card B.

In the composite type card connector 100 of the present invention of the above-mentioned structure, the operation will be described below when the small card A and the large card B having different sizes are actually used.

The small card A is a card having smaller dimensions in thickness, length and width will be described. The width of the small card A in this case is approximately equal to or slightly smaller than a normal width between the lower stepped sections 122 in the card-inserting opening 114 of the composite type card connector 100 of the present invention. Accordingly, when the small card A is inserted from the card-inserting opening 114 into the composite card connector 100 of the present invention, it is possible to smoothly insert the same beneath the movable plate 110 without contact therewith, whereby the small card A can be held between the lower stepped sections 122 beneath the movable plate 110 by means of the movable plate 110. The movable plate 110 is firmly held at the lower position by the operating plate 111. In this state, the small card A is inserted beneath the movable plate 110 so that the forward end of the small card A is brought into contact with the first card receiving section 153A of the ejection member 151. If the small card A is further pushed inward, the first card receiving section 153A of the ejection member 151 abuts to a wall of the first cut section 167A of the base 115. If the hand is released therefrom at this time, the small card A is slightly pushed back and the end 160 of the cam lever 159 is located in the recess 156 of the heart cam 155 and firmly held there. Thereby, the inserted small card A is firmly located at the inserted position so that the pad section of the small card A is favorably brought into contact with the contact section 105A of the first contact member 105, which state is retained.

In this state, the small card A is suitably held within the composite type card connector 100 by the movable plate 110 and can be freely taken out. The small card A thus firmly inserted into the composite type card connector 100 of the present invention is elastically supported by elastic members 128, 129 of left and right card holding mechanisms 108 in the card-inserting opening 114 to prevent the small card A from coming off. Further, since the small card A is engaged with the projection 146a of the spring contact 146, the card-identification is carried out. In this manner, the small card A is inserted and mounted to achieve the required object.

Subsequently, when the small card A is taken out, the small card A is once slightly pushed to release the lock of the ejection mechanism 109, and thereafter the small card A is gripped at the end thereof by fingers and pulled out from the composite type card connector 100.

Next, the operation will be described below when the large card B is used together with the composite type card connector 100 of the present invention.

When the large card B is used together with the composite type card connector 100 of the present invention, the large card B is inserted from the card-inserting opening 114 of the composite type card connector 100 of the present invention in a similar manner as in the first embodiment.

The large card B is a card having larger dimensions in thickness, length and width as well as of a stair-shape on opposite sides thereof. Accordingly, when the large card B is inserted into the composite type card connector 100 from the card-inserting opening 114, the forward end of the large card B is first brought into contact with the front end of the movable plate 110 to push the movable plate 110 deeper inward. Thereby, the movable plate 110 slides along the horizontal section 143 of the guide groove 141 and then is pushed obliquely upward along the sloped section 142 of the guide groove 141.

The large card B is inserted into the card-mounting section 112 in the composite type card connector 100 while pushing the movable plate 110 upward by the forward end thereof and creeping under the movable plate 110, and engaged with the second card receiving section 153B of the ejection member 151 to press the ejection member 151. At this time, the ejection member 151 slides so that the end 160 of the cam lever 159 follows the cam groove 156 of the ejection member 151.

Soon, the end 160 of the cam lever 159 reaches the recess 157 of the cam groove 156 and held there, whereby the ejection member 151 is fixed. In this state, the large card B is completely inserted so that the pad sections on the underside of the large card B are firmly brought into contact and connected with the contact sections 106A of the second contact members 106. In such a manner, the large card B is mounted and used for performing the required object.

When the large card B is taken out, the large card B is once slightly pushed as described above to release the latching engagement with ejection mechanism 109, after which the large card B is taken out.

One feature of the composite type card connector 100 of the present invention structured as described above is that the small card A is always guided to be securely held at a regular position.

That is, in the composite type card connector 100 of the present invention described above, the small card A must be always located at the regular position between the lower stepped sections 122 in the card-inserting opening 114 as shown in FIGS. 49 and 50.

However, since the small card A is small in lateral width and thickness, it is liable to be erroneously located at the middle-step position or the upper-step position as shown in FIGS. 51 to 54.

Therefore, the composite type card connector 100 of the present invention is adapted to be properly guided to the regular position even if the small card A is deflected or inclined when inserted.

For example, as shown in FIGS. 51 and 52, when the small card A is inserted to deflect toward the middle-step position of the card-inserting opening 114, the forward end corner of the small card A slides on the upper surface of the elastic member 128 disposed contiguous to the lower stepped section 122, abuts to the slope 132, and is guided inward by the slope 132 to be introduced to the regular position on the inside surface of the lower stepped section 122. When the small card A is further inserted, the forward end corner of the small card A is brought into contact with the first card receiving section 153A of the ejection member 151 to further slide the latter so that the small card A is located at the regular position.

Also, as shown in FIGS. 53 and 54, when the small card is inserted to deflect toward the upper-step position of the card-inserting opening 114, the forward end corner of the small card A slides on the guide slope 130 of the upper surface of the upper stepped section 121, first abuts to the slope 131, and is guided inward. Then, it abuts to the slope 132 to be guided further inward and is introduced to the regular position on the inside surface of the lower stepped section 122. When the small card A is further inserted, the forward end corner of the small card A is brought into contact with the first card receiving section 153A of the ejection member 151 to further slide the latter so that the small card A is located at the regular position.

As described above, even if the small card A is inserted to deflect toward the upper-step position or the middle-step position, the small card A is always guided to the regular position between the lower-stepped sections 122 and 122 by the guide slope 130 and the slopes 131 and 132.

As described, according to the composite type card connector 100 of the present invention, it is possible to use two kinds of cards having different sizes; the small card A and the large card B; without any troubles by a common card connector while necessitating no modification of the cards. Also, according to the present invention, it is possible to form the composite type card connector 100 itself as a case of a flat and thin housing shape, and preferably use it for an information terminal device or an electronic instrument such as a portable telephone, a game machine, a notebook type personal computer, a portable audio set, a television set, a video deck, a digital camera or a music microphone.

Further, since the composite type card connector 100 of the present invention is less in number of movable parts and simple in structure, it is capable of miniaturizing the size and facilitating the replacement.

As described above, according to the composite type card connector of the present invention, it is possible to use two kinds of cards having different sizes; the small card A and the large card B; without any troubles by a common card connector while necessitating no modification of the cards. Also, according to the present invention, it is possible to form the composite type card connector as a case of a flat and thin housing shape, and preferably use it for an information terminal device or a electronic instrument such as a portable telephone, a game machine, a notebook type personal computer, a portable audio set, a television set, a video deck, a digital camera or a music microphone.

The composite type card connector of the present invention may be used for an information terminal device or an electronic instrument such as a portable telephone, a telephone set, a game machine, a notebook type personal computer, a portable audio set, a television set, a video deck, a digital camera or a music microphone.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A composite type card connector comprising a connector body having a card-inserting opening, at least one side of which is open, a cover member combined with said connector body, and a plurality of contacts consisting of first contact members for a first card and second contact members for a second card arranged within said connector body, wherein
   a switching operation mechanism having a movable plate and an operating plate provided for using said first and second cards which are two kinds of cards of different sizes, such that a card-mounting section in said connector body is switched by said switching operation mechanism.

2. A composite type card connector as defined by claim 1, further comprising an ejection mechanism having an ejection member for discharging said first and/or second card inserted in the card connector and a spring member for elastically deflecting said ejection member, wherein said ejection member is provided with a heart cam having a cam groove on the circumference thereof so that one end of a cam lever pivoted at the other end to said connector body is engaged with said cam groove.

3. A composite type card connector as defined by claim 1, wherein an elastically biased locking mechanism is provided for fixing said movable plate of said switching operation mechanism when the first card in inserted.

4. A composite type card connector as defined by claim 3, wherein said movable plate is formed of a plate-like member having left and right side portions bending downward and operates as a guide member movable obliquely upward and downward along a guide groove of said operating plate, said operating plate is adapted to move said movable plate obliquely upward by a guiding member when said second card is inserted.

5. A composite type card connector as defined by claim 3, wherein said locking mechanism comprises a locking arm of a cantilever spring formed at least on one side of said cover member or said operating plate, and a slidable locking member having a projection with which is engaged a front end of said locking arm, and said locking member is movable in association with said movable plate.

6. A composite type card connector as defined by claim 1, wherein stepped sections are disposed in said connector body in correspondence to said cards of different sizes.

7. A composite type card connector as defined by claim 6, wherein said stepped section has an upper stepped section and a lower stepped section.

8. A composite type card connector as defined by claim 7, wherein a guide slope is provided in one of said upper stepped sections, for guiding said first card to a required position.

9. A composite type card connector as defined by claim 1, wherein a cross-section of said card-inserting opening taken in the direction orthogonal to the card-inserting direction is of a flat and provided in a stair-like form on each of opposite sides thereof, a width between both said left and right upper stepped sections is larger than that between both said left and right lower stepped sections.

10. A composite type card connector as defined by claim 9, further comprising a card holding mechanism wherein a cantilever-like elastic member projected inward is provided in the vicinity of said card-inserting opening along said lower stepped section, for elastically pressing a lateral side of said first card.

11. A composite type card connector as defined by claim 9, wherein a guide slope is provided in one of said upper stepped sections, for guiding said first card to a required position.

12. A composite type card connector as defined by claim 7, further comprising a card holding mechanism wherein a cantilever-like elastic member projected inward is provided in the vicinity of said card-inserting opening along said lower stepped section, for elastically pressing a lateral side of said first card.

13. A composite type card connector as defined by claim 12, wherein said elastic member is a spring member of metallic material molded or press-fit into said connector body.

14. A composite type card connector as defined by claim 12, wherein said elastic member is a spring member of synthetic resinous material molded integral with said connector body.

15. A composite type card connector as defined by claim 14, wherein said spring member of synthetic resinous material is different in height between left and right ones.

* * * * *

UNITED STATES PATENT AND TRADEMARK OFFICE
CERTIFICATE OF CORRECTION

PATENT NO. : 6,863,571 B2
DATED : March 8, 2005
INVENTOR(S) : Shigeru Sato et al.

It is certified that error appears in the above-identified patent and that said Letters Patent is hereby corrected as shown below:

Column 25,
Line 2, "in" should read -- is --; and
Line 31, "and provided" should read -- and reversely convex shape, said stepped section is provided --.

Signed and Sealed this

Fourteenth Day of June, 2005

JON W. DUDAS
*Director of the United States Patent and Trademark Office*